(12) United States Patent
Kobayashi et al.

(10) Patent No.: US 7,725,228 B2
(45) Date of Patent: May 25, 2010

(54) METHOD AND SYSTEM FOR ASSISTING A DRIVER OF A VEHICLE OPERATING A VEHICLE TRAVELING ON A ROAD

(75) Inventors: Yosuke Kobayashi, Yokohama (JP); Genpei Naito, Yokohama (JP); Takeshi Kimura, Yokohama (JP)

(73) Assignee: Nissan Motor Co., Ltd., Yokohama-Shi (JP)

( * ) Notice: Subject to any disclaimer, the term of this patent is extended or adjusted under 35 U.S.C. 154(b) by 876 days.

(21) Appl. No.: 10/591,133

(22) PCT Filed: Mar. 2, 2005

(86) PCT No.: PCT/JP2005/004028

§ 371 (c)(1),
(2), (4) Date: Aug. 30, 2006

(87) PCT Pub. No.: WO2005/084992

PCT Pub. Date: Sep. 15, 2005

(65) Prior Publication Data

US 2007/0198136 A1    Aug. 23, 2007

(30) Foreign Application Priority Data

Mar. 3, 2004 (JP) .............................. 2004-059020

(51) Int. Cl.
*B60K 28/00* (2006.01)
*G08G 1/16* (2006.01)
(52) U.S. Cl. ......................................... 701/45; 701/301
(58) Field of Classification Search ........................ None
See application file for complete search history.

(56) References Cited

U.S. PATENT DOCUMENTS

| 4,628,317 | A | * | 12/1986 | Nishikawa et al. ........... 340/903 |
| 6,934,614 | B2 | | 8/2005 | Yamamura et al. |
| 2003/0163240 | A1 | | 8/2003 | Egami |
| 2003/0233902 | A1 | | 12/2003 | Hijikata |
| 2003/0236608 | A1 | | 12/2003 | Egami |
| 2004/0225424 | A1 | | 11/2004 | Yamamura et al. |
| 2005/0187713 | A1 | | 8/2005 | Yamamura et al. |
| 2005/0222742 | A1 | * | 10/2005 | Yamamura ..................... 701/70 |
| 2005/0279554 | A1 | | 12/2005 | Kobayashi et al. |

FOREIGN PATENT DOCUMENTS

| EP | 1 285 842 A2 | 2/2003 |
| EP | 1 327 552 A2 | 7/2003 |

(Continued)

*Primary Examiner*—Michael J. Zanelli
(74) *Attorney, Agent, or Firm*—Foley & Lardner LLP

(57) ABSTRACT

A system and method for assisting a driver operating a vehicle traveling on a road includes a reaction force device configured to determine a first reaction force value and a second reaction force value, a weighting device configured to weight the second reaction force value, a reaction force selection device configured to select one of the first and weighed second reaction force values, a driver controlled input device manually operable by the driver, and an actuator coupled to the driver controlled input device and configured to transmit the selected one of the first and weighed second force values to the driver by a reaction force input via the driver controlled input device.

20 Claims, 31 Drawing Sheets

FOREIGN PATENT DOCUMENTS

| | | |
|---|---|---|
| EP | 1 375 232 A1 | 1/2004 |
| JP | 10-166889 A | 6/1998 |
| JP | 10-166890 A | 6/1998 |
| JP | 2000-054860 A | 2/2000 |
| JP | 2003-191830 A | 7/2003 |
| WO | WO 2004/028847 A1 * | 4/2004 |

* cited by examiner

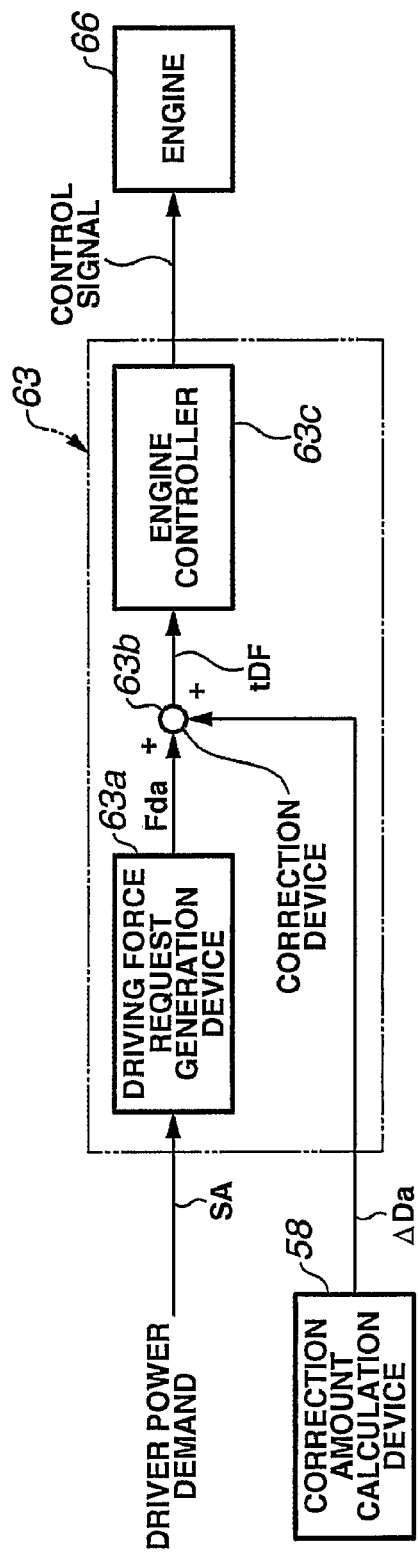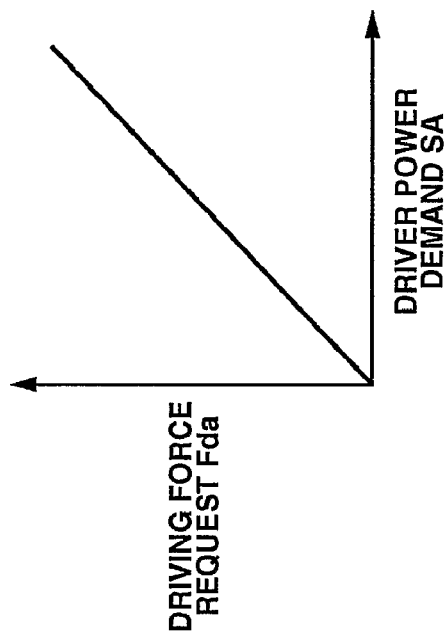

US 7,725,228 B2

METHOD AND SYSTEM FOR ASSISTING A DRIVER OF A VEHICLE OPERATING A VEHICLE TRAVELING ON A ROAD

RELATED APPLICATION

The present application claims the benefit of priority from Japanese Patent Application No. 2004-59020, filed Mar. 3, 2004, which application is hereby incorporated by reference in its entirety.

TECHNICAL FIELD

1. Field of the Invention

The present invention relates to a method and system for assisting a driver operating a vehicle traveling on a road.

2. Background Art

The conventional art describes systems for assisting a driver operating a vehicle traveling on a road.

JP10-166889A discloses a driver assisting system, which, when a distance to a preceding vehicle drops to a predetermined value, sets an increased magnitude of a reaction force from an accelerator pedal. JP10-166890A discloses a similar driver assisting system. JP2000-54860A discloses a driver assisting system, which, when an automatic control is being carried out, sets an increased magnitude of a reaction force from an accelerator pedal. U.S. 2003/0163240 A1, published Aug. 28, 2003, discloses a driver assisting system, which adjusts a reaction force from an accelerator pedal upon detection of a discontinuous change in environment around a vehicle. JP2003-1901830A discloses a driver assisting system by performing brake control based on results of calculation of a time-to-collision (TTC) with respect to each obstacle in the path of a vehicle in a manner to avoid unsmooth changes in braking force.

U.S. 2003/0060936 A1, published Mar. 27, 2003, discloses a driver assisting system. This system comprises a data acquisition system acquiring data including information on status of a vehicle and information on environment in a field around the vehicle, a controller, and at least one actuator. The controller determines a future environment in the field around the vehicle using the acquired data, for making an operator response plan in response to the determined future environment, which plan prompts the operator to operate the vehicle in desired manner for the determined future environment. The actuator is coupled to a driver controlled input device to mechanically affect operation of the input device in a manner that prompts, via a haptic input from the driver controlled input device, the driver to operate the vehicle in the desired manner.

A need remains for an improved method and system that provides a driver with transient information that a vehicle is approaching an obstacle as well as stable information that the vehicle is following the obstacle in front of the vehicle.

An object of the present invention is to provide a method and system that meets the above-mentioned need.

SUMMARY OF INVENTION

According to one aspect of the present invention, there is provided a system for assisting a driver operating a vehicle traveling on a road. This system comprises a reaction force device that determines different reaction force values respectively based on stable information and transient information regarding the vehicle and an obstacle detected in a path of the vehicle. A driver controlled input device is provided that is manually operable by the driver. An actuator is coupled to the driver controlled input device and responsive to the reaction force device to selectively transmit the reaction force values to the driver via a reaction force input from the driver controlled input device.

BRIEF DESCRIPTION OF THE DRAWINGS

FIG. 5 is a block diagram of a driving force controller with a correction device indicated as a summation point.

FIG. 6 shows a driving force request (Fda) versus driver power demand (SA, an accelerator pedal position) characteristic provided by a driving force request generation device of the driving force controller.

DETAILED DESCRIPTION OF THE INVENTION

Figure 1:
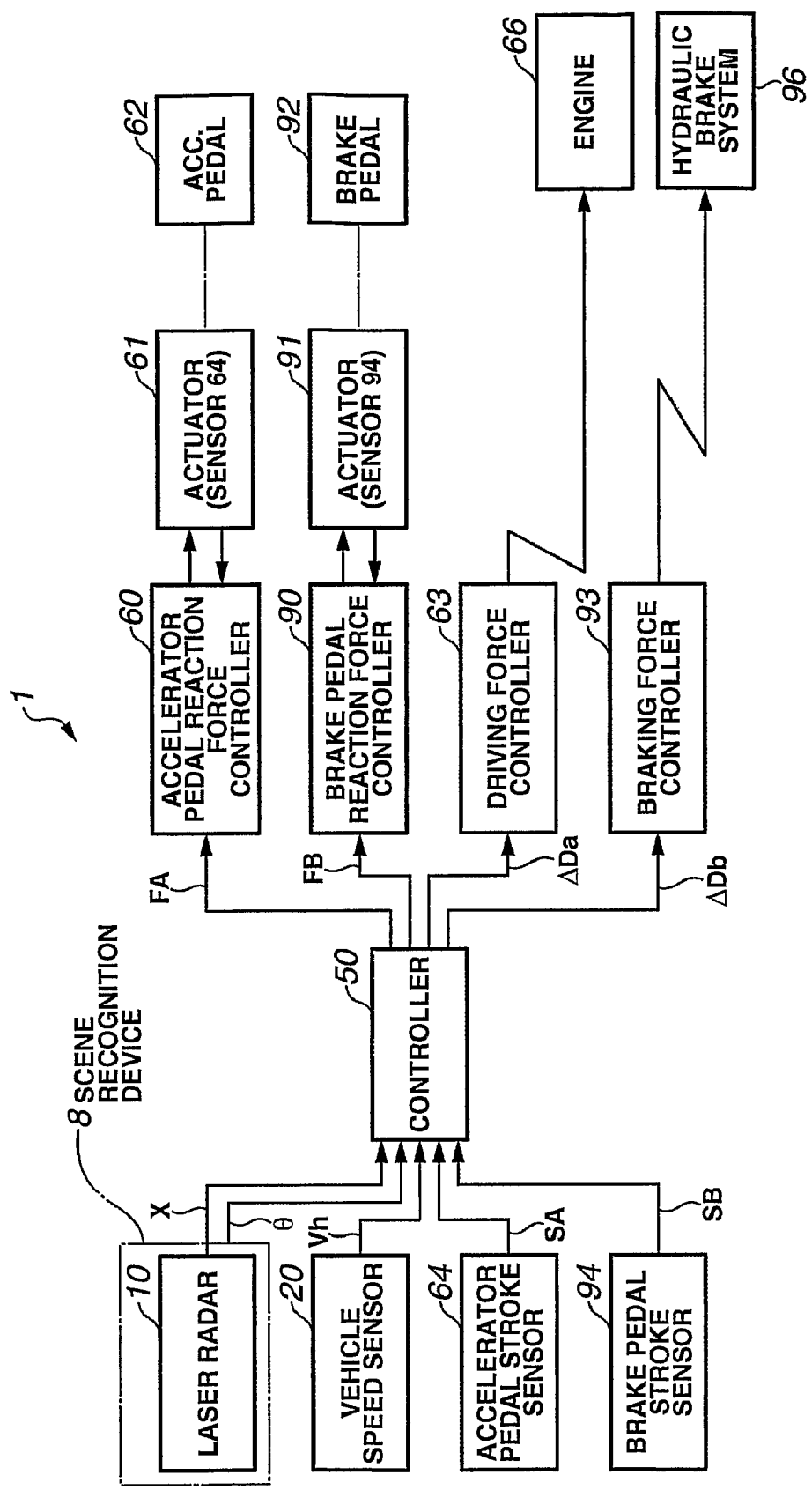
FIG. 1 is a block diagram of an embodiment of the system according to embodiments of the present invention.
Figure 9:
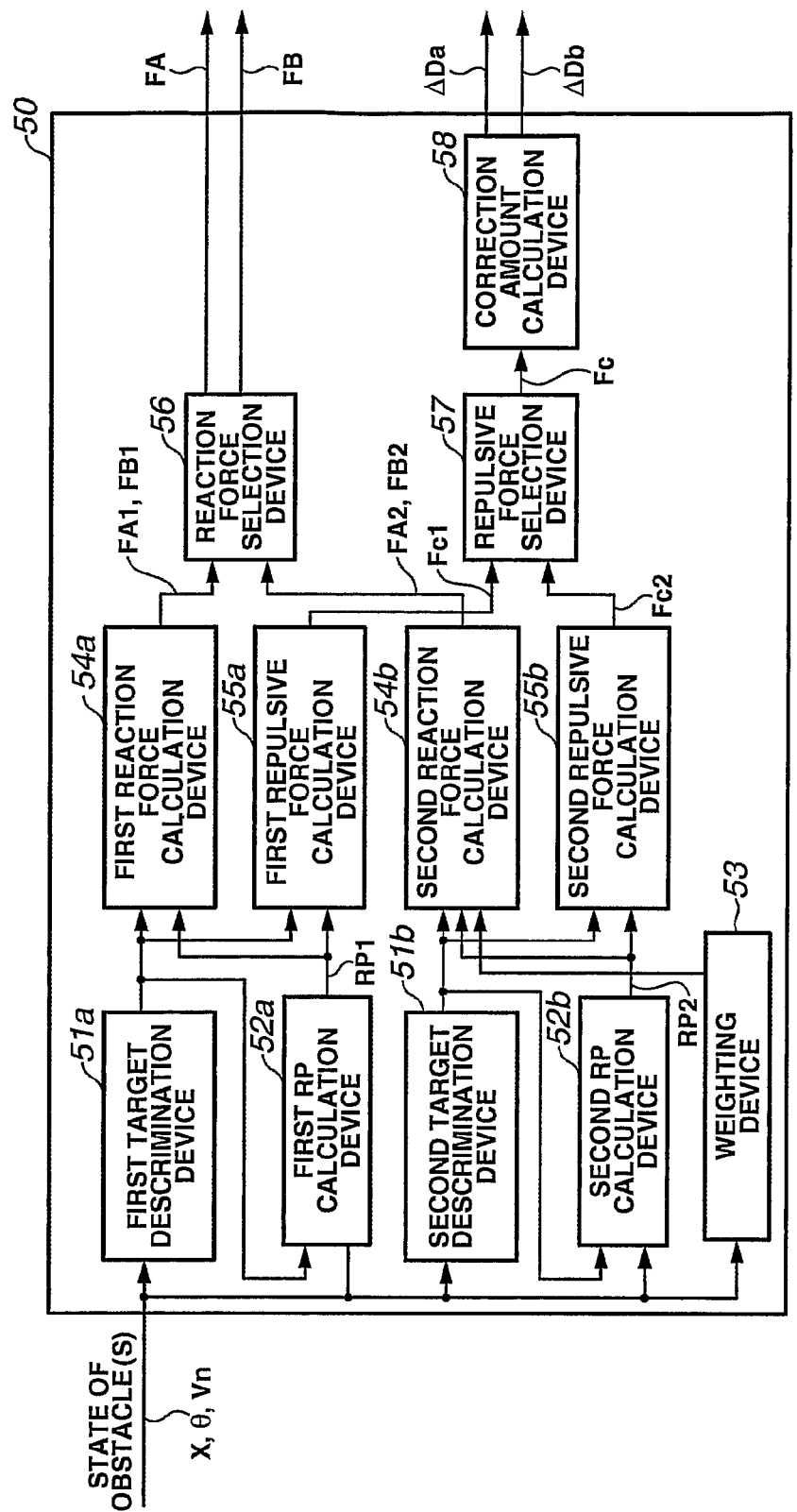
FIG. 9 is a block diagram of a controller of the system shown in FIG. 1.
Figure 31:
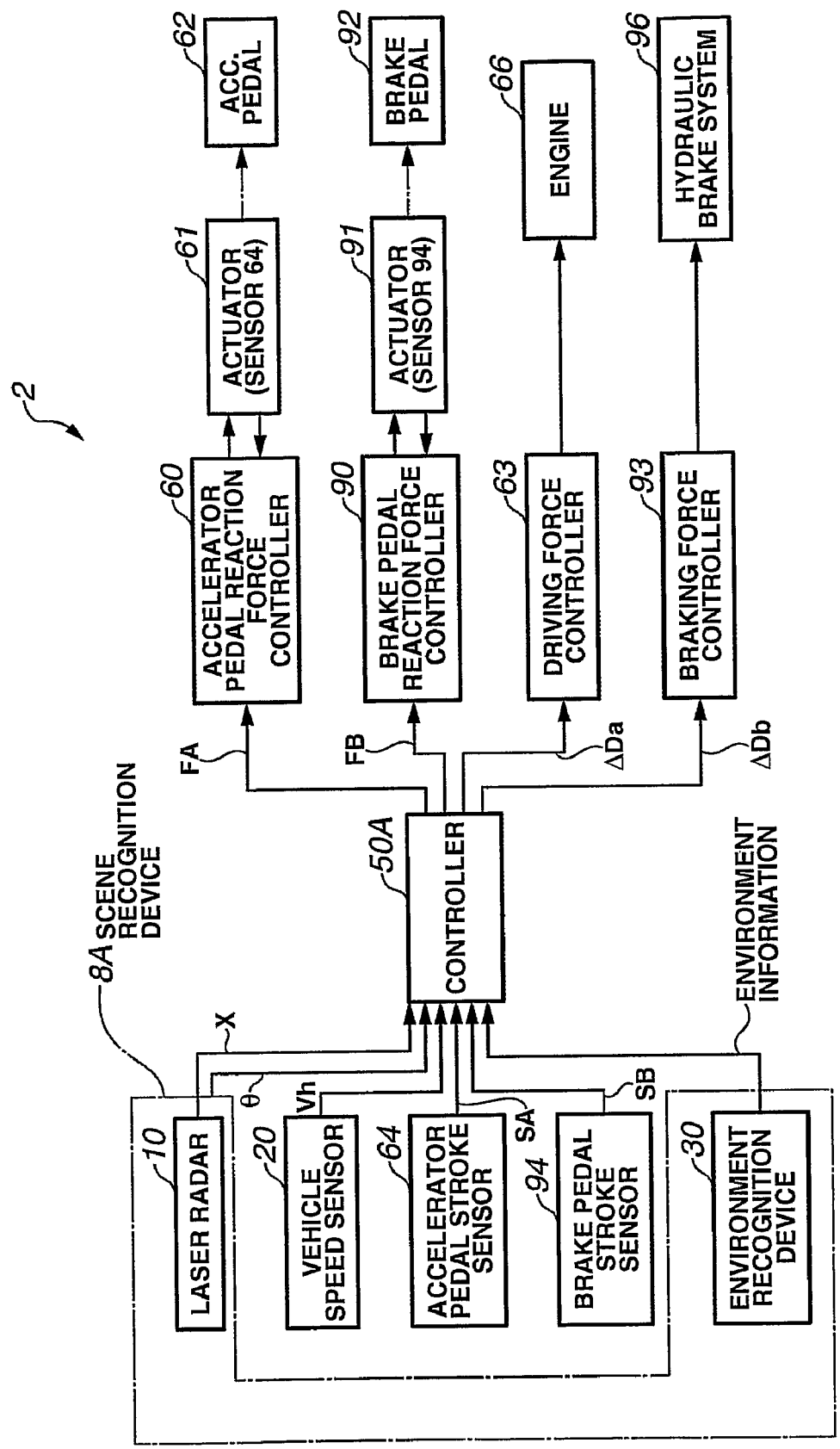
FIG. 31 is a block diagram, similar to FIG. 1, of another embodiment of the system according to the present invention.
Figure 34:
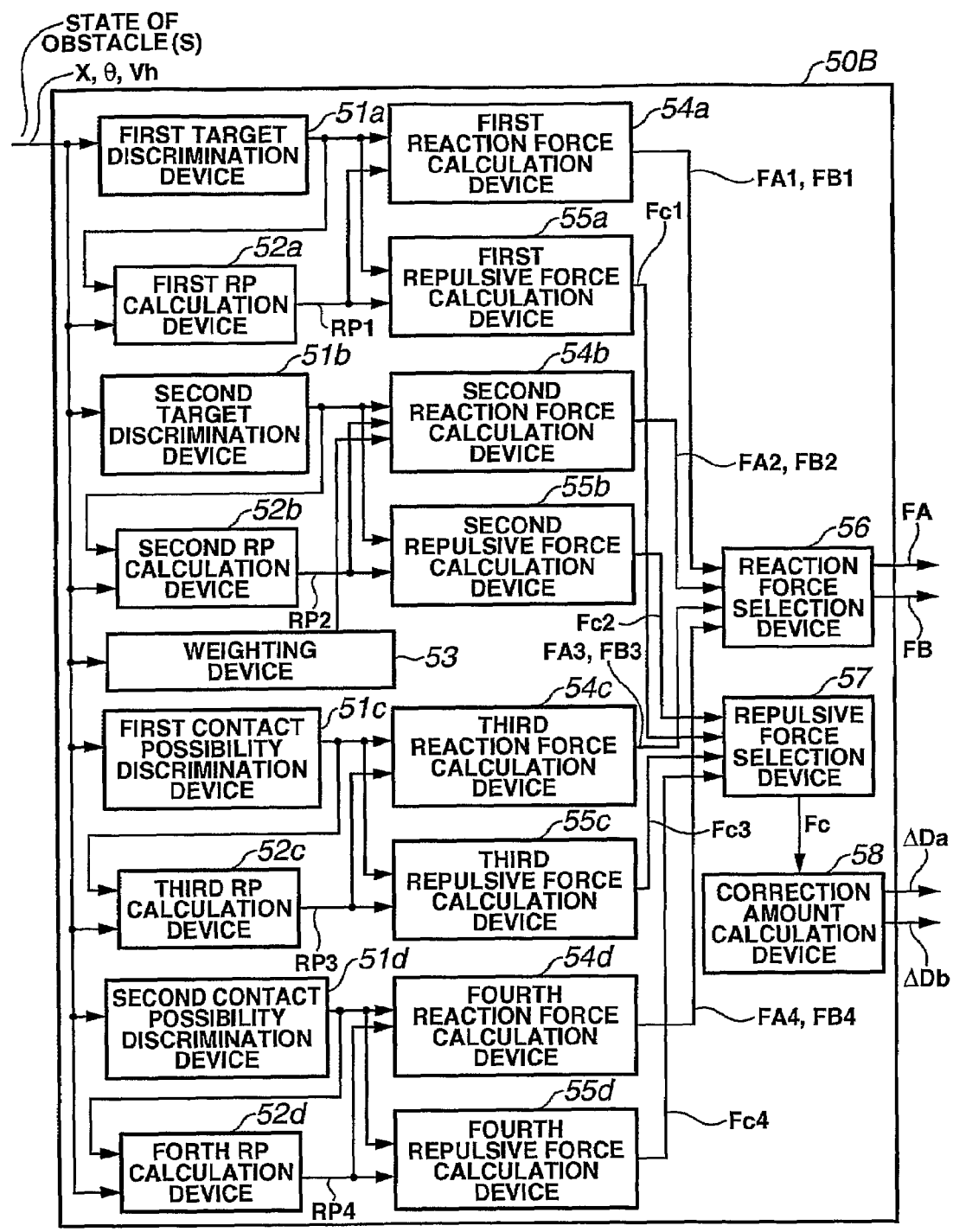
FIG. 34 is a block diagram of a modified controller, which may be used in the system shown in FIG. 1.

The present invention provides a system, denoted generally by reference numeral 1 in FIG. 1 or reference numeral 2 in FIG. 31, using controller 50 (see FIG. 9) or controller 50B (see FIG. 34), for assisting a driver operating a vehicle 5 traveling on a road. The system 1 or 2 comprises a scene recognition device 8 (see FIG. 1) or 8A (see FIG. 31) detecting an obstacle in front of the vehicle 5. The system 1 or 2 comprises at least two subsystems. In FIG. 9, the at least two subsystems include a first subsystem 51a, 52a, 54a, and 55a, and a second subsystem 51b, 52b, 53, 54b, and 55b. In FIG. 34, the at least two subsystems include, in addition to the first and second subsystems, a third subsystem 51c, 52c, 54c, and 55c, and a fourth subsystem 51d, 52d, 54d, and 55d. As the discussion proceeds, it will be understood that each of the at least two subsystems conducts one of different analyses of the detected obstacle at one of the blocks labeled "target discrimination devices" 51a and 51b (see FIGS. 9 and 34) and blocks labeled "contact possibility discrimination devices" 51c and 51 d. As the discussion proceeds, it may well be understood that conducting one of different analyses of the detected obstacle provides one of different partially overlapped periods allowing determination of a risk RP1 or RP2 derived from the detected obstacle to give a variable (FA1, FB1, Fa2, Fb2, Fc1 or Fc2, see FIG. 9; FA3, FB3, FA4, FB4, Fc3, or Fc4, see FIG. 34). A selection device selects one out of concurrently occurring ones of the variables to produce out of the variables a final variable existing over at least adjacent two of the different period. The final variable (FA, FB or Fc) is transmitted to the driver via a haptic input, such as a reaction force from a driver controlled input device or a change in acceleration/deceleration of the vehicle.

The term "target discrimination" will be herein used to mean one of different analyses of data from the scene recognition device 8 (or 8A) regarding the detected obstacle(s) in front of the vehicle 5 to determine whether or not the detected obstacle is a target obstacle to be treated for further processes that follow in one of the subsystems. Similarly, the term "contact possibility discrimination" will be herein used to mean one of different analyses of data from the scene recognition device 8A regarding the detected obstacle(s) in front of the vehicle 5 to determine whether or not there is a high possibility that the vehicle 5 may come into contact with the detected obstacle. If this is the case, the detected obstacle is a target obstacle to be treated for further processes that follow in one of the subsystems.

Figure 32:
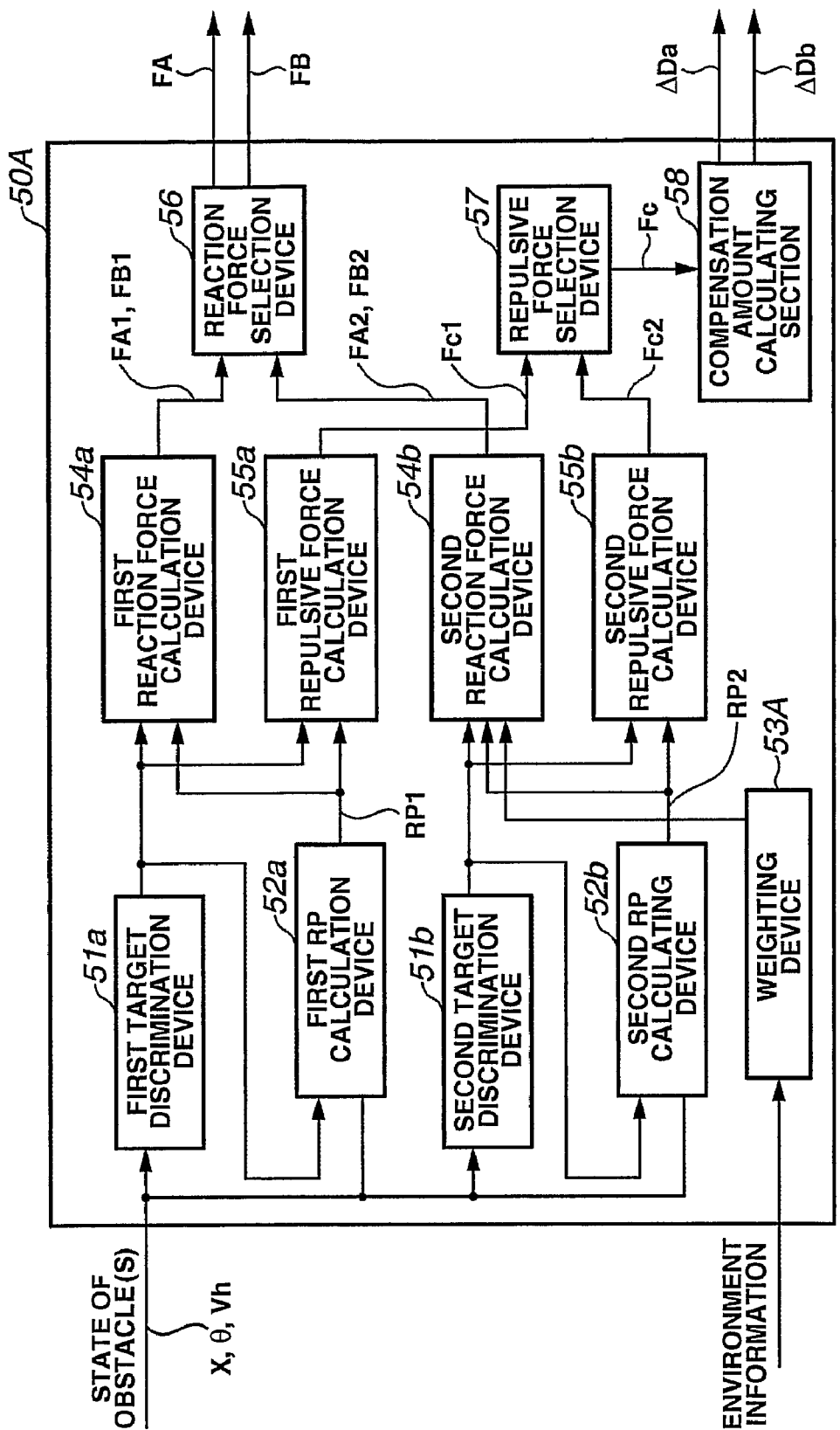
FIG. 32 is a block diagram, similar to FIG. 9, of a controller of the embodiment shown in FIG. 31.
Figure 33:
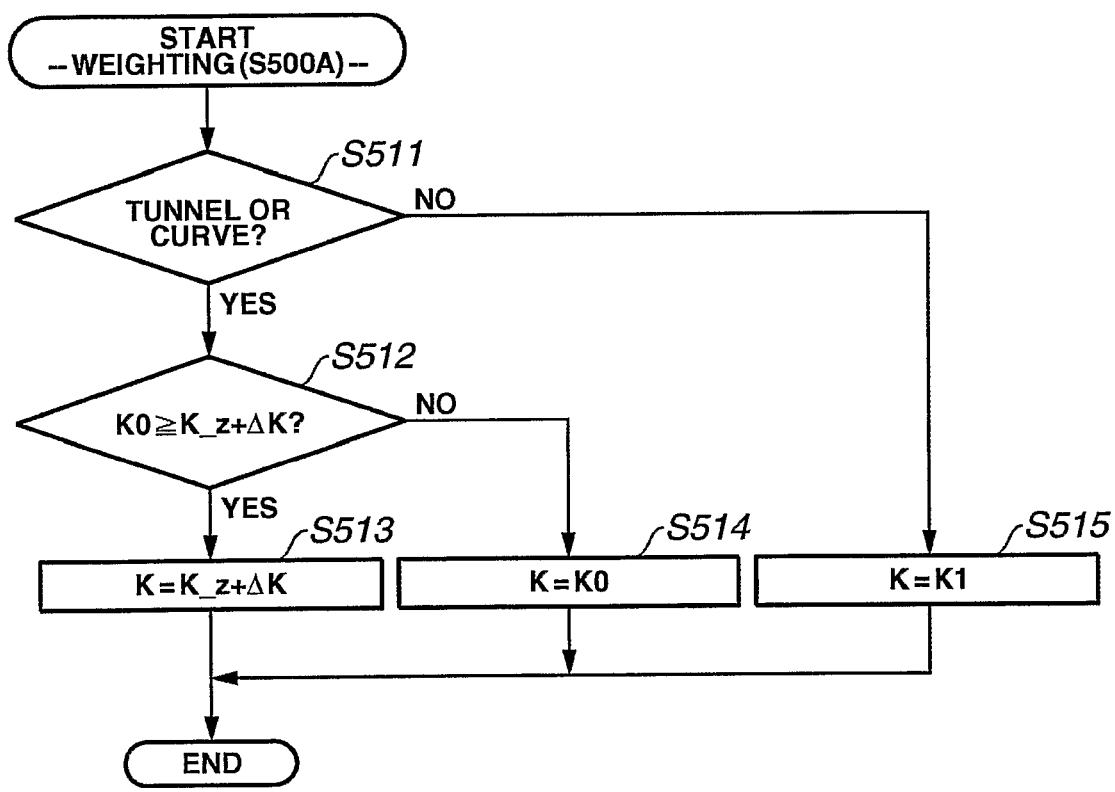
FIG. 33 is a flow chart, similar to FIG. 15, of a weighting subroutine.

The accompanying drawings illustrate various exemplary embodiments of a method and system according to the present invention. Like reference numerals are used throughout each Figure to designate like parts or portions. FIGS. 1 to 30(f) are used below for description of one embodiment. FIGS. 31 to 33 are used later for description of another embodiment, and FIGS. 34 to 41 for description of the modified controller.

Figure 2:
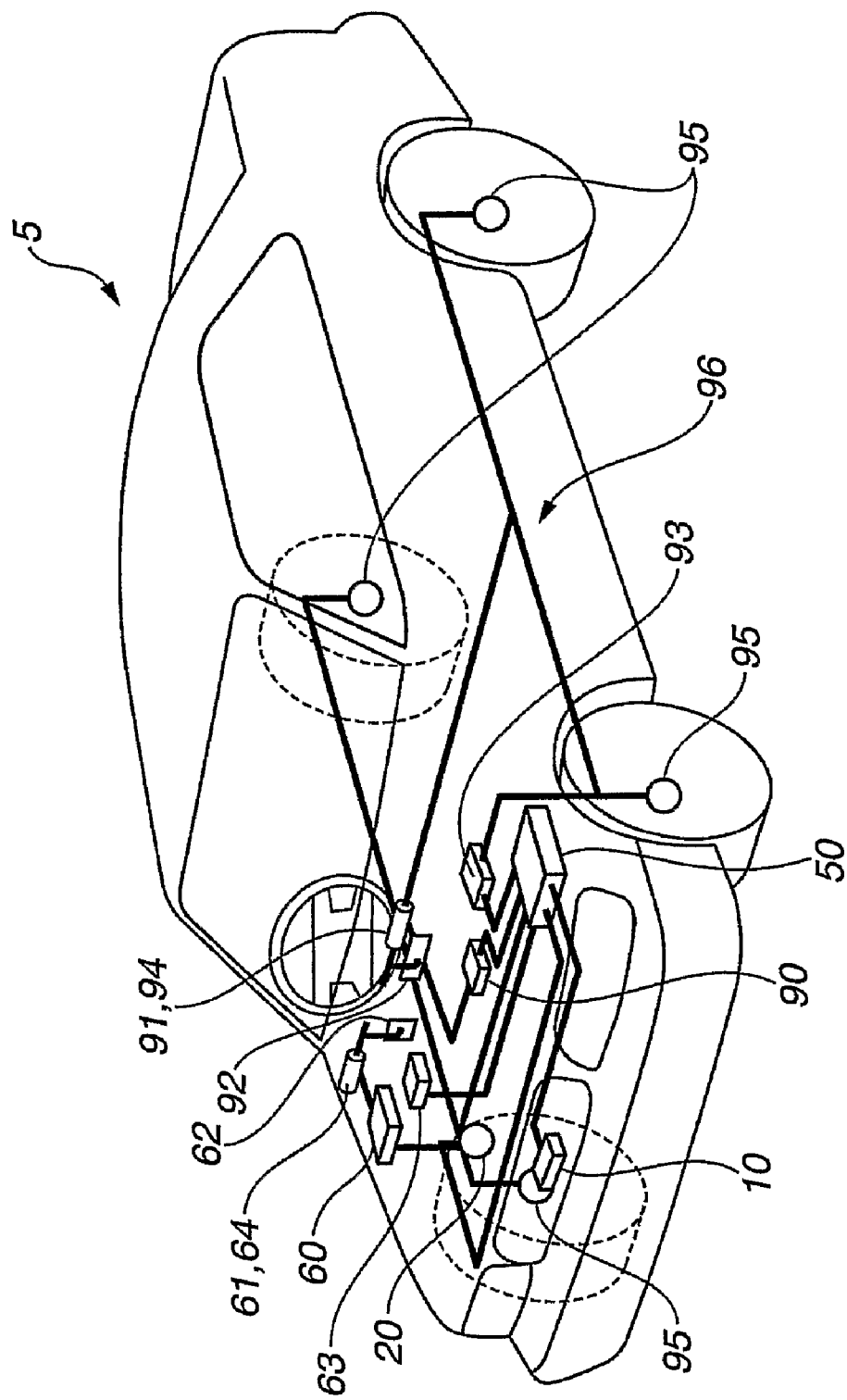
FIG. 2 is a perspective view of a motor vehicle equipped with the system according to embodiments of the present invention.

Turning now to FIGS. 1 and 2, the scene recognition device 8 includes a radar 10 positioned at a center of a front grill or a front bumper of the vehicle 5 (see FIG. 2) for transmitting pulsed beam or radar waves ahead of the vehicle in order to detect obstacles within the field of view of the radar. Although it may be a conventional millimeter wave, frequently modulated continuous (FMCW) radar, the radar 10, in this embodiment, is a conventional infrared laser radar. An infrared pulsed beam travels, as a transmitted beam, toward a measurement zone. A light receiving device receives the transmitted beam returning from an obstacle inside the measurement zone. With the use of a rotating polygonal mirror, two-dimensional scanning in the forward direction is possible, so that the pulsed beam can be swiveled horizontally due to the rotation of the polygonal mirror, and the pulsed beam can be swiveled vertically due to a plurality of mirror surfaces of the polygonal mirror inclined at different angles. In the exemplary embodiment, the pulsed beam can be swiveled horizontally and laterally about 6 degrees to each side of a longitudinal line passing through the center of the vehicle 5.

The scene recognition device 8 may include a camera, Global Positioning System (GPS) device, a navigation device, and any other appropriate devices capable of providing data useful for recognition of environment around the vehicle 5 along with detection of obstacle(s) in front of the vehicle 5.

Based on the time delay and phase difference between the transmitted beam from the laser radar 10 and the received reflected beam, a control logic can determine a distance and azimuth angle between each of the detected obstacle(s) and the vehicle 5. The control logic may be implemented within the scene recognition device 8 or a controller 50.

Figure 4:
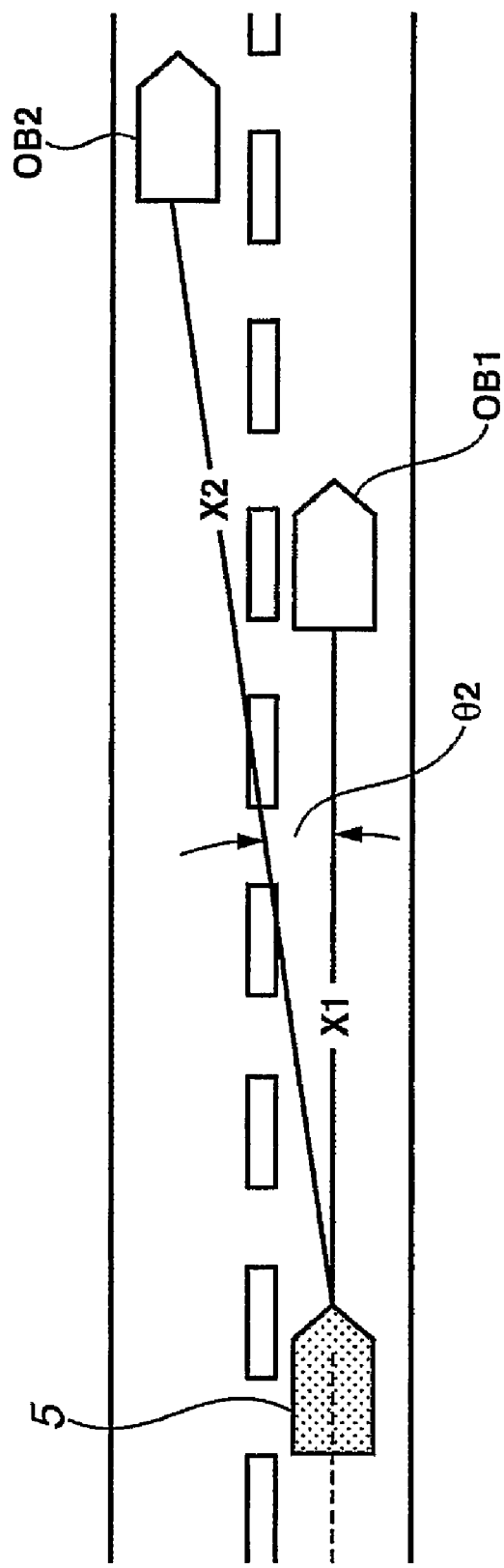
FIG. 4 is a state diagram of a vehicle equipped with the system according to embodiments of the present invention traveling along a two-lane road with two obstacles (preceding vehicles) in front of the vehicle.

This step of determination may be better understood by referring to the state diagram of FIG. 4. The vehicle 5 is shown traveling along a two-lane road. A plurality of obstacles OB1 and OB2 are shown in front of the vehicle 5. These obstacles are determined to be at a distance X1, X2, and at an azimuth angle θ1=0, θ2, respectively from the vehicle 5.

The controller 50 processes data generated by the scene recognition device 8 and vehicle dynamics, such as vehicle speed Vh from a vehicle speed sensor 20.

The vehicle speed sensor 20 may determine the vehicle speed Vh by processing outputs from wheel speed sensors. The vehicle speed sensor 20 may include an engine controller or a transmission controller, which can provide a signal indicative of the vehicle speed.

The controller 50 may contain a microprocessor including as usual a central processing unit (CPU), and computer readable storage medium, such as a read only memory (ROM), a random access memory (RAM). The computer readable storage medium contains computer readable instructions thereon to implement at least two subsystems of the system 1. Each of the at least two subsystems provides one of different analyses of the detected obstacle to provide one of different at least partially overlapped periods. Example of the different partially overlapped periods is illustrated in FIG. 30(d). In FIG. 30(d), one period ends at moment tb and the adjacent partially overlapped period begins at moment ta. The provided one period allows determination of a risk (RP1 or RP2) to give a variable (Fa2, FA1, Fc2, Fc1, see FIG. 30(f) and FIG. 30(e)). A selection device (56, 57) selects one out of concurrently occurring ones of the variables (during overlapped time from ta to tb, see FIG. 30(e)) to interconnect the variables (Fc1, Fc2) into a final variable (Fc) existing over at least adjacent two of the different periods.

In order to transmit the final variable FA to the driver via a haptic input from a driver controlled input device in the form of an accelerator pedal 62, an actuator 61 coupled to the accelerator pedal 62 is activated to produce a reaction force under the control of an accelerator pedal reaction force controller 60 that operates in response to the control signal FA.

Figure 3:
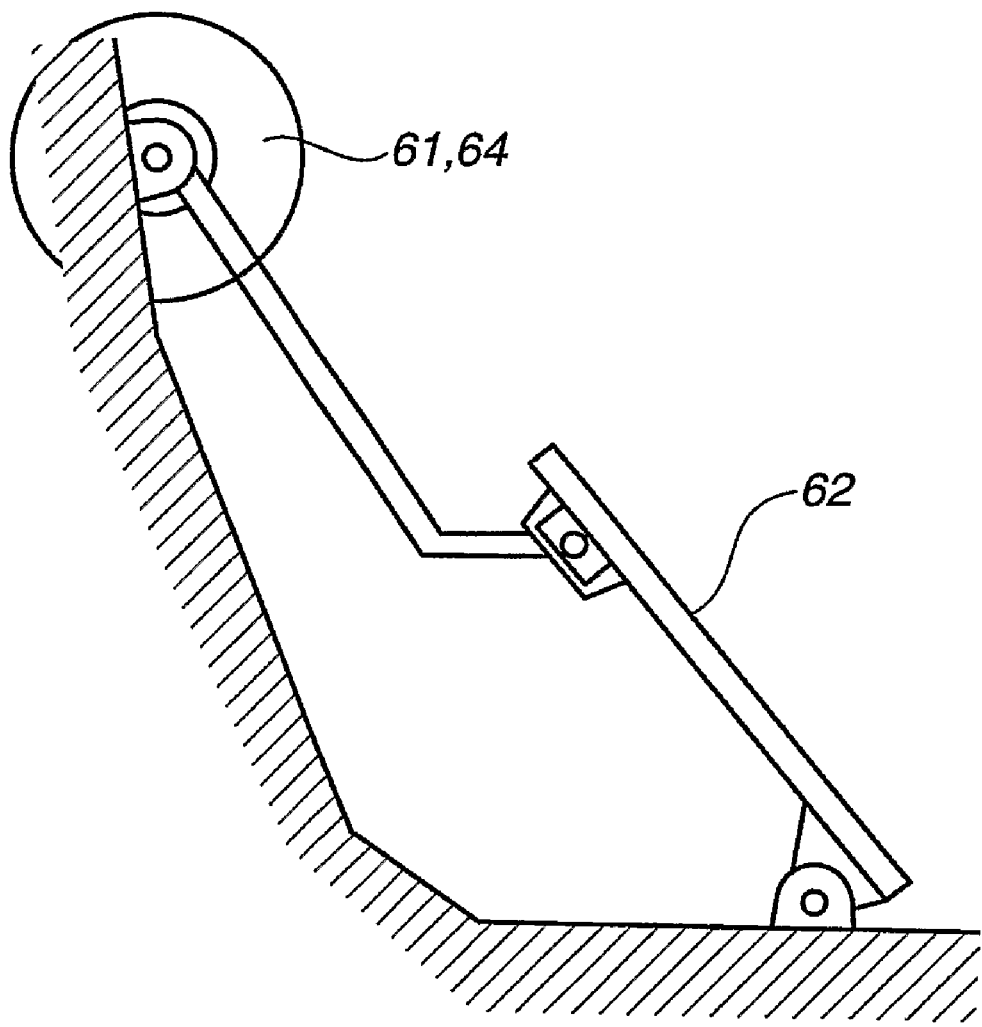
FIG. 3 is a schematic diagram of an actuator coupled with a driver controlled input device to transmit varying of an output signal to a driver via a reaction force from a manually operable pedal.

The final variable FA indicates an accelerator pedal reaction force value determined by the controller 50. In response to the final variable FA, the accelerator pedal reaction force controller 60 regulates operation of the actuator 61. The actuator 61 is in the form of a servomotor mechanically coupled to the accelerator pedal 62. FIG. 3 shows one example of the accelerator pedal 62 with the servomotor 61 and the accelerator pedal stroke sensor 64. For understanding of the driver controlled input device, reference should be made to U.S. 2003/0236608 A1 (published Dec. 25, 2003) and also to U.S. 2003/0233902 A1 (published Dec. 25, 2003), both of which have been hereby incorporated by reference in their entireties.

An accelerator pedal stroke sensor 64 is provided to detect an angular position of the servomotor 61 linked to the accelerator pedal 62. As the angular position of the servomotor 61 varies with different positions of the accelerator pedal 62, the accelerator pedal stroke sensor 64 can generate a sensor signal indicative of a driver power demand SA expressed via the accelerator pedal 62. The sensor signal indicative of the driver power demand SA is fed to the accelerator pedal reaction force controller 60 for position control of the servomotor 61. The sensor signal indicative of the driver power demand SA is fed also to a driving force controller 63 in the conventional manner for calculation of a control signal to an engine 66.

In order to transmit the final variable FB to the driver via a haptic input from a driver controlled input device in the form of a brake pedal 92, an actuator 91 coupled to the brake pedal 92 is activated to produce a reaction force under the control of a brake pedal reaction force controller 90 that operates in response to the final variable FB.

The final variable FB indicates a brake pedal reaction force value determined by the controller 50. In response to the final variable FB, the brake pedal reaction force controller 90 regulates operation of the actuator 91. The actuator 91 is in the form of a servomotor mechanically coupled to the brake pedal 92 in the same manner as the servomotor 61 is coupled with the accelerator pedal 62 (see FIG. 3). The actuator 91 may be in the form of a computer controlled hydraulic brake assist system that is capable of regulating a power assist.

A brake pedal stroke sensor 94 is provided to detect an angular position of the servomotor 91 linked to the brake pedal 92. As the angular position of the servomotor 91 varies with different positions of the brake pedal 92, the brake pedal stroke sensor 94 can generate a sensor signal indicative of a driver brake demand SB expressed via the brake pedal 62. The sensor signal indicative of the driver brake demand SB is fed to the brake pedal reaction force controller 90 for position control of the servomotor 91. The sensor signal indicative of the driver brake demand SB is fed also to a braking force controller 93 in the conventional manner for calculation of a control signal to a hydraulic brake system 96. As shown in FIG. 2, the hydraulic brake system 96 includes wheel brakes 95.

The system 1 may optionally provide a haptic input to the driver by modifying operation of the engine 66 of the vehicle 5 via the driving force controller 63 and/or by modifying operation the hydraulic brake system 96 of the vehicle 5 via the braking force controller 93. In order to create the haptic input acceptable to the driver, the controller 50 processes the data generated by the accelerator pedal stroke sensor 64 and brake pedal stroke sensor 94 to assure an appropriate change in relationship between the driver power demand SA and driving force applied to the vehicle 5 and/an appropriate change in relationship between the driver brake demand SB and braking force applied to the vehicle 5.

With continuing reference to FIG. 1, the controller 50 provides a correction signal indicative of a driving force correction amount ΔDa to the driving force controller 63 and a correction signal indicative of a braking force correction amount ΔDb to the braking force controller 93.

The block diagram of FIG. 5 illustrates the driving force controller 63 with a correction device 63b as indicated by a summation point. The driving force controller 63 includes a driving force request generation device 63a and an engine controller 63c. The driving force request generation device 63a receives the driver power demand SA and provides a driving force request Fda by data processing to realize the driving force request (Fda) versus driver power demand (SA) characteristic illustrated in FIG. 6. The driving force request Fda is fed to the correction device 63b. At the correction device 63b, the driving force request Fda is modified by the driving force correction amount Δ Da to provide the modified result as a target driving force tDF. In response to the target driving force tDF, the engine controller 63c provides an engine control signal applied to the engine 66 to accomplish the corrected characteristic as illustrated by the fully drawn line in FIG. 28.

Figure 7:
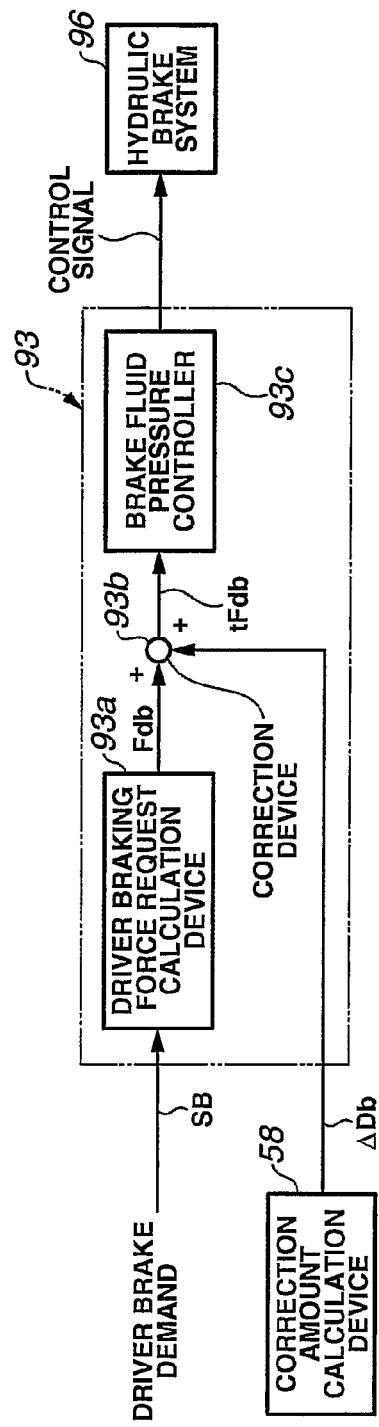
FIG. 7 is a block diagram of a braking force controller with a correction device indicated as a summation point.
Figure 8:
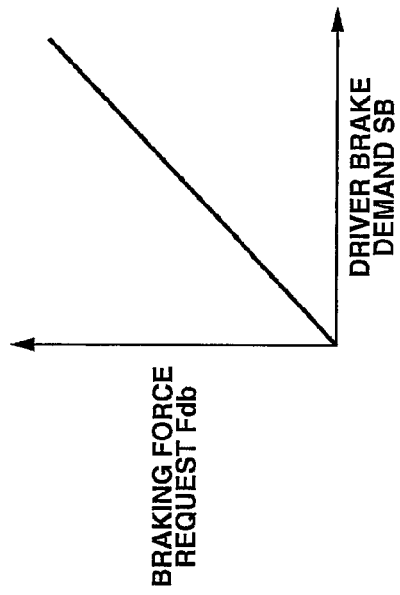
FIG. 8 shows a braking force request (Fdb) versus driver brake demand (SB, a brake pedal position) characteristic provided by a braking force request generation device of the braking force controller.

The block diagram of FIG. 7 illustrates the braking force controller 93 with a correction device 93b as indicated by a summation point. The braking force controller 93 includes a braking force request generation device 93a and a brake fluid pressure controller 93c. The braking force request generation device 93a receives the driver brake demand SB and provides a braking force request Fdb by data processing to realize the braking force request (Fdb) versus driver brake demand (SB)

characteristic illustrated in FIG. 8. The braking force request Fdb is fed to the correction device 93b. At the correction device 93b, the braking force request Fdb is modified by the braking force correction amount ΔDb to provide the modified result as a target braking force tFdb. In response to the target braking force tFdb, the brake fluid pressure controller 93c determines a brake fluid pressure and provides a brake control signal applied to the hydraulic brake system 96 to accomplish the corrected characteristic as illustrated by the fully drawn line in FIG. 28.

The implementation of the method and system according to the present invention can best be explained using the block diagram of FIG. 9. As mentioned before, the at least two subsystems of the system 1 include a first subsystem 51a, 52a, 54a, and 55a, and a second subsystem 51b, 52b, 53, 54b, and 55b. The distance and azimuth angle θ between each of the detected obstacle(s) and the vehicle 5, and the vehicle speed Vh are fed to a first target discrimination device 51a of the first subsystem and a second target discrimination device 51b of the second subsystem. They are fed also to a first risk (RP) calculation device 52a of the first subsystem and to a second risk (RP) calculation device 52b of the second subsystem.

The system 1 has introduced two notions, namely, a time headway THW and a time to collision TTC, and provides two different analyses of the detected obstacle at the first and second target discrimination devices 51a and 51b to provide two different partially overlapped periods, respectively.

In the first subsystem, the first target discrimination device 51a determines whether or not the detected obstacle is a target obstacle by effecting a first target discrimination based on the vehicle speed Vh of the vehicle 5 and a distance X to the detected obstacle from the vehicle 5. Specifically, the first target discrimination device 51a determines that the detected obstacle is the target obstacle when the time headway THW is less than a first threshold value Th1, for example, 1.5 seconds. Upon determination that the detected obstacle is the target obstacle, the first target discrimination device 51a activates a first risk (RP) calculation device 52a, a first reaction force calculation device 54a, and a first repulsive force calculation device 55a.

In the second subsystem, the second target discrimination device 51b determines whether or not the detected obstacle is a target obstacle by effecting a second target discrimination based on a relative vehicle speed Vr of the vehicle 5 to the detected obstacle and the distance X. Specifically, the second target discrimination device 51b determines that the detected obstacle is the target obstacle when the time to collision TTC is less than a second threshold value Th2, for example, 10 seconds. Upon determination that the detected obstacle is the target obstacle, the second target discrimination device 51b activates a second risk (RP) calculation device 52b, a second reaction force calculation device 54b, and a second repulsive force calculation device 55b.

Figure 12:
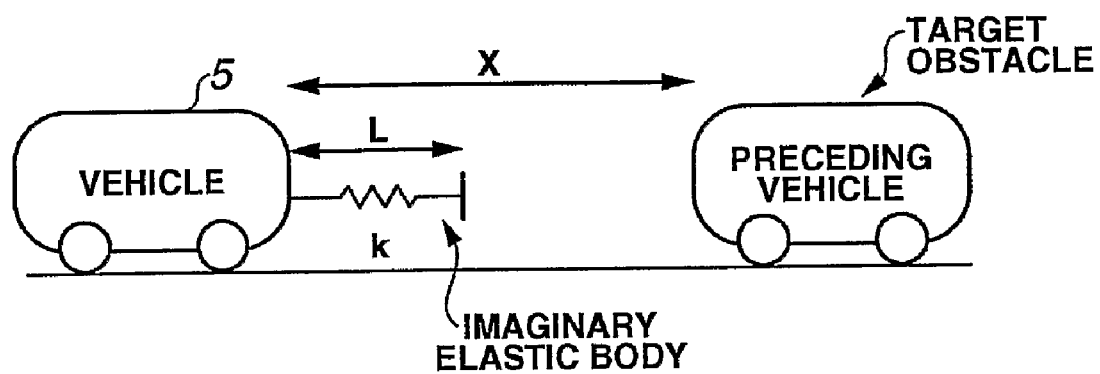
FIG. 12 is a state diagram of a vehicle traveling on a road with a preceding vehicle in front of the vehicle, illustrating the concept of an imaginary elastic body used for calculation of a risk (RP) derived from the preceding vehicle and a repulsive force (Fc).
Figure 13:
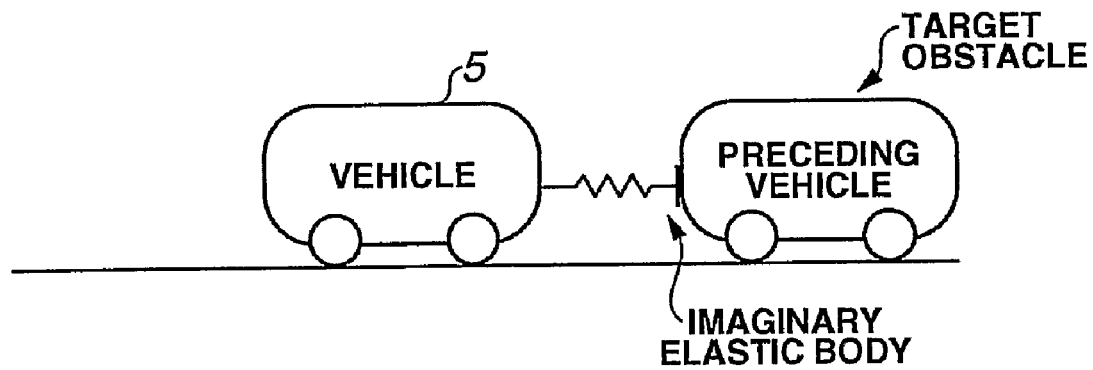
FIG. 13 is the state diagram of the vehicle having approached the preceding vehicle when the risk grows.

When it is activated, each of the first and second risk calculation devices 52a and 52b determines a risk (RP) derived from the target obstacle. Referring to FIGS. 12 and 13, the manner of determining a risk (RP) is described.

The state diagram of FIG. 12 illustrates the vehicle 5 traveling on a road with a target obstacle in the form of a preceding vehicle in front of the vehicle 5. Assuming that the vehicle 5 has an imaginary elastic body extending from the front bumper forwardly toward the preceding vehicle, a model considered is that the imaginary elastic body is compressed between the vehicle body 5 and the preceding vehicle as shown in FIG. 13 to generate a pseudo running resistance against the vehicle 5. The risk (RP) derived from the preceding vehicle may be defined as a spring force applied to the vehicle by the imaginary elastic body compressed between the vehicle 5 and the preceding vehicle, and may be expressed as:

$$RP = k \times (L-X) \qquad \text{(Equation 1)}$$

where: k is the spring constant of the imaginary elastic body, L is an unstressed length of the imaginary elastic body, and X is a distance between the vehicle 5 and the preceding vehicle.

The risk (RP) derived from the preceding vehicle is 0 (zero) when the distance X exceeds the length L as in the state of FIG. 12. After the imaginary elastic body has come into contact with the preceding vehicle, the imaginary elastic body is compressed so that the risk (RP) becomes great as the distance X becomes short.

Turning back to the block diagram of FIG. 9, the first risk (RP) calculation device 52a determines a risk derived from the target obstacle and provides the determined risk, as a first risk RP1. The first risk RP1 is fed to the first reaction force calculation device 54a and also to the first repulsive force calculation device 55a. In the embodiment, the first reaction force calculation device 54a determines, as variables, a first accelerator pedal reaction force value FA1 versus the first risk RP1 by using the illustrated relationship of FIG. 19 and also a first brake pedal reaction force value FB1 versus the first risk RP1 by using the illustrated relationship of FIG. 20. The first repulsive force calculation device 55a determines, as a variable, a first repulsive force value Fc1 versus the first risk RP1 by using the illustrated relationship of FIG. 22.

The second risk (RP) calculation device 52b determines a risk derived from the target obstacle and provides the determined risk, as a second risk RP2. The second risk RP2 is fed to the second reaction force calculation device 54b and also to the second repulsive force calculation device 55b. In the embodiment, the second reaction force calculation device 54b determines, as variables, a second accelerator pedal reaction force value Fa2 versus the second risk RP2 by using the illustrated relationship of FIG. 19 and also a second brake pedal reaction force value Fb2 versus the second risk RP2 by using the illustrated relationship of FIG. 20. The second repulsive force calculation device 55b determines, as a variable, a second repulsive force value Fc2 versus the second risk RP2 by using the illustrated relationship of FIG. 22.

Determination of the first risk RP1 is allowed during a stable period when the vehicle 5 follows the preceding vehicle (or obstacle) in front. Determination of the second risk RP2 is allowed during a transient period partially overlapping the stable period. The first risk RP1 may be called a stable risk, and the second risk RP2 a transient risk. The repulsive force is a force applied by an imaginary elastic body compressed between the vehicle 5 and the preceding vehicle in front. The imaginary elastic body was briefly mentioned in connection with FIGS. 12 and 13, but will be further described later in connection with FIG. 29.

The second subsystem also includes a weighting device 53. The weighting device 53 processes the data from the scene recognition device 8 to determine the amount of weighting used for performing a weighting of each of the second reaction force values Fa2 and Fb2 to provide, as variables, a weighted second accelerator pedal reaction force value FA2 and a weighted second brake pedal reaction force value FB2.

The first and the weighted second accelerator pedal reaction force values FA1 and FA2, and the first and the weighted second brake pedal reaction force values FB1 and FB2 are fed to the reaction force selection device 56. Following a predetermined rule, the reaction force selection device 56 selects an appropriate one of the first and the weighted second accelerator pedal reaction force values FA1 and FA2 and provides the selected one as a accelerator pedal reaction force (APRF) indicative final variable FA. The final variable FA is fed to the accelerator pedal reaction force controller 60 (see FIG. 1). In the same manner, the reaction force selection device 56 selects one of the first and the weighted second brake pedal reaction force values FB1 and FB2 and provides the selected one as a brake pedal reaction force (BPRF) indicative final variable FB. The final variable FB is fed to the brake pedal reaction force controller 90 (see FIG. 1).

The first and second repulsive force values Fc1 and Fc2 are fed to a repulsive force selection device 57. The repulsive force selection device 57 selects an appropriate one of the first and second repulsive force values Fc1 and Fc2 and provides the selected one, as a repulsive force (RF) indicative final variable Fc. The repulsive force indicated by the final variable Fc is regarded as a pseudo running resistance to the vehicle 5. The final variable Fc is fed to a correction amount calculation device 58. Regarding the final variable Fc as the running resistance, the correction amount calculation device 58 determines a driving force correction amount ΔDa and a braking force correction amount ΔDb. The correction amount calculation device 58 provides the determined driving and braking force correction amounts ΔDa and ΔDb to the driving and braking force controllers 63 and 93, respectively (see FIG. 1).

In the exemplary embodiment, the controller 50 implements all of the devices of the block diagram shown in FIG. 9 in software.

Figure 10:
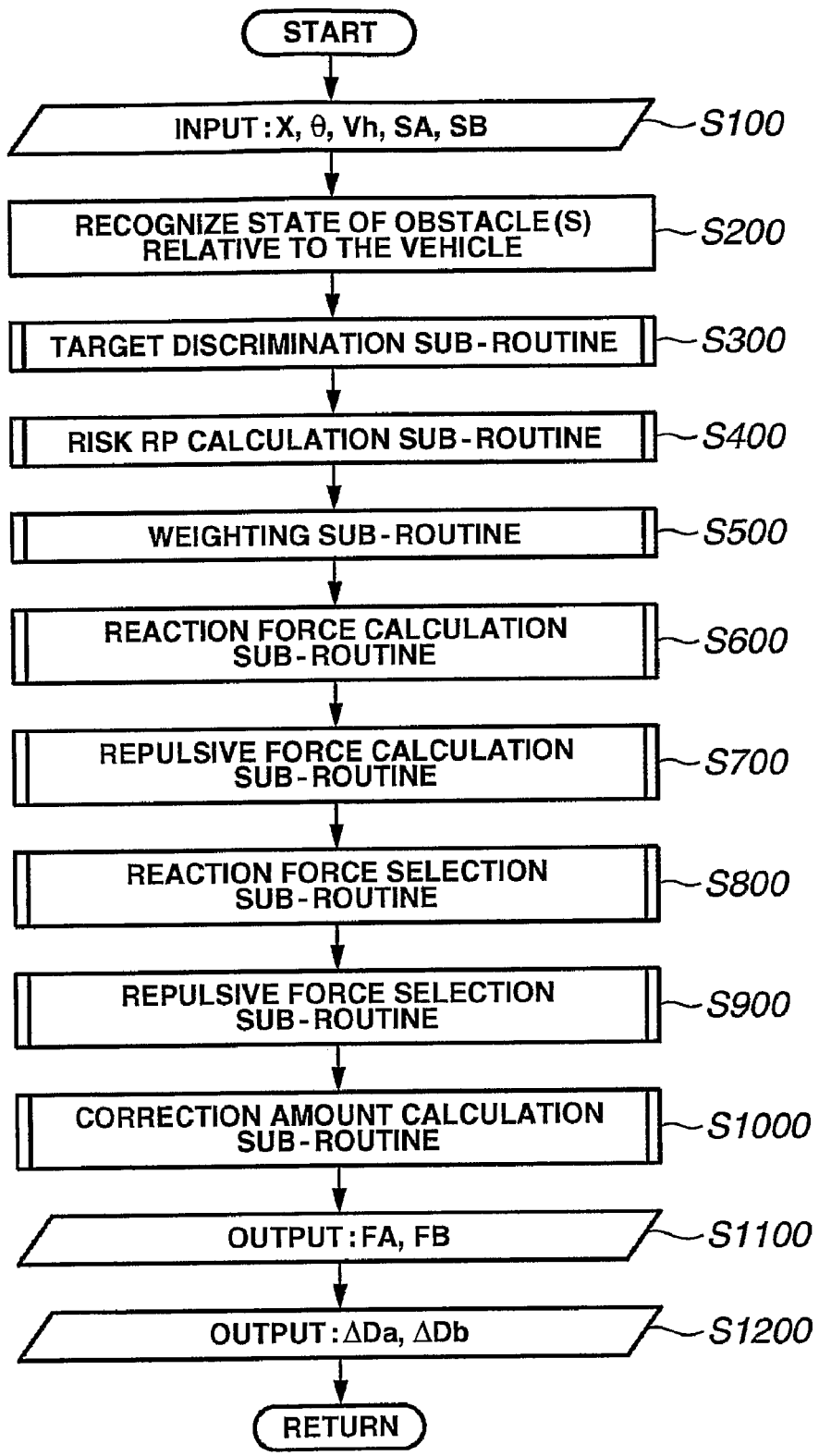
FIG. 10 is a flow chart of a main control routine illustrating the implementation of the operation of the embodiment shown in FIG. 1.

FIG. 10 is a flow chart of a main control routine illustrating the operation of the embodiment of the system according to the present invention. In the embodiment, the controller 50 repeats execution of the main control routine at regular intervals of, for example, 50 milliseconds.

In FIG. 10, at step S100, the controller 50 performs reading operation to receive, as inputs, data (distance X, azimuth angle θ) generated by the scene recognition device 8, vehicle dynamics, such as vehicle speed Vh from the vehicle speed sensor 20, and driver demands, such as driver power demand SA from the accelerator pedal stroke sensor 64 and driver brake demand SB from the brake pedal stroke sensor 94.

At step S200, the controller 50 recognizes the state of obstacle(s) relative to the vehicle 5 from a relative position of each obstacle to the vehicle 5, and a direction and a speed of travel of the obstacle, which are obtained by processing the present and past data obtained at step S100. The controller 50 thus selects the obstacle in the path of the vehicle 5 and recognizes the state of the selected obstacle from its position, its travel direction, and its travel speed relative to the vehicle 5.

Figure 11:
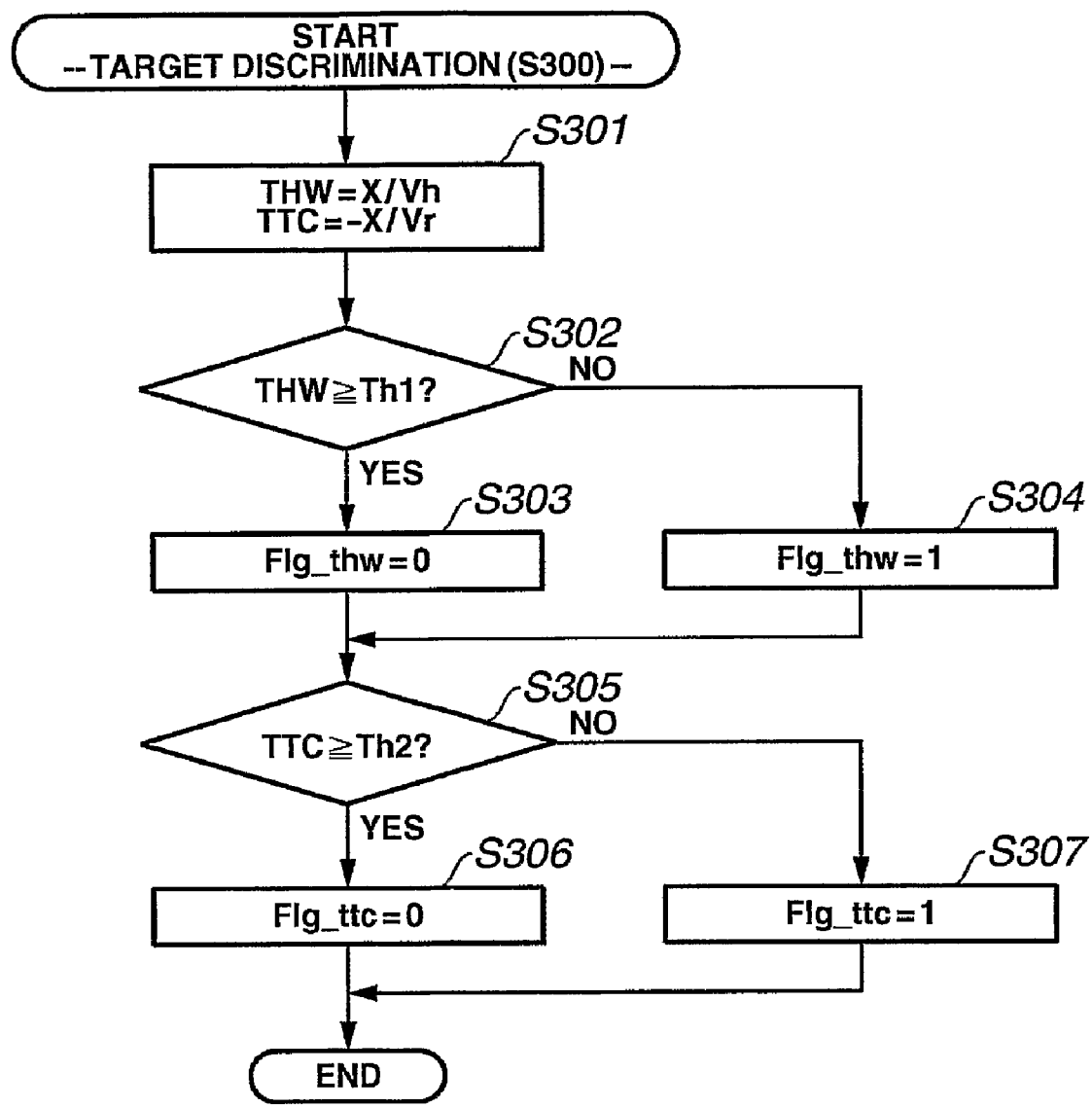
FIG. 11 is a flow chart of a target discrimination subroutine.

At step S300, the controller 50 executes a target discrimination sub-routine shown in FIG. 11 to determine whether or not the detected obstacle is a target obstacle.

Referring to the target discrimination sub-routine of FIG. 11, at step S301, the controller 50 calculates a time headway THW between each of the detected obstacles and the vehicle 5. The time headway THW may be expressed as:

$$THW = X/Vh \quad \text{(Equation 2)}$$

At the same step S301, the controller 50 calculates a time to collision TTC between each of the detected obstacles and the vehicle speed 5. The time to collision TTC may be expressed as:

$$TTC = -X/Vr \quad \text{(Equation 3)}$$

where: Vr is a relative vehicle speed given by subtracting a vehicle speed Vh of the vehicle 5 from a speed of the detected obstacle.

At step S302, the controller 50 determines whether or not the time headway THW between the detected obstacle and the vehicle 5 is greater than or equal to the first threshold value Th1, for example, 1.5 seconds. If this is the case, that is, THW is not less than Th1, the controller 50 determines that the detected obstacle is not a target obstacle and sets a THW target flag Flg_thw to 0 (Flg_thw=0) at step S303. If, at step S302, the time headway THW is less than Th1, the controller 50 determines that the detected obstacle is a target obstacle and sets the THW target flag Flg_thw to 1 (Flg_thw=1) at step S304. After step S303 or S304, the routine proceeds to step S305.

At step S305, the controller 50 determines whether or not the time to collision TTC between the detected obstacle and the vehicle 5 is greater than or equal to the second threshold value Th2, for example, 10 seconds. If this is the case, that is, TTC is not less than Th2, the controller 50 determines that the detected obstacle is not a target obstacle and sets a TTC target flag Flg_ttc to 0 (Flg_ttc=0) at step S306. If, at step S305, the time to collision TTC is less than Th2, the controller 50 determines that the detected obstacle is a target obstacle and sets the TTC target flag Flg_ttc to 1 (Flg_ttc=1) at step S307. After step S306 or S307, the routine proceeds to step S400 (see FIG. 10).

Figure 14:
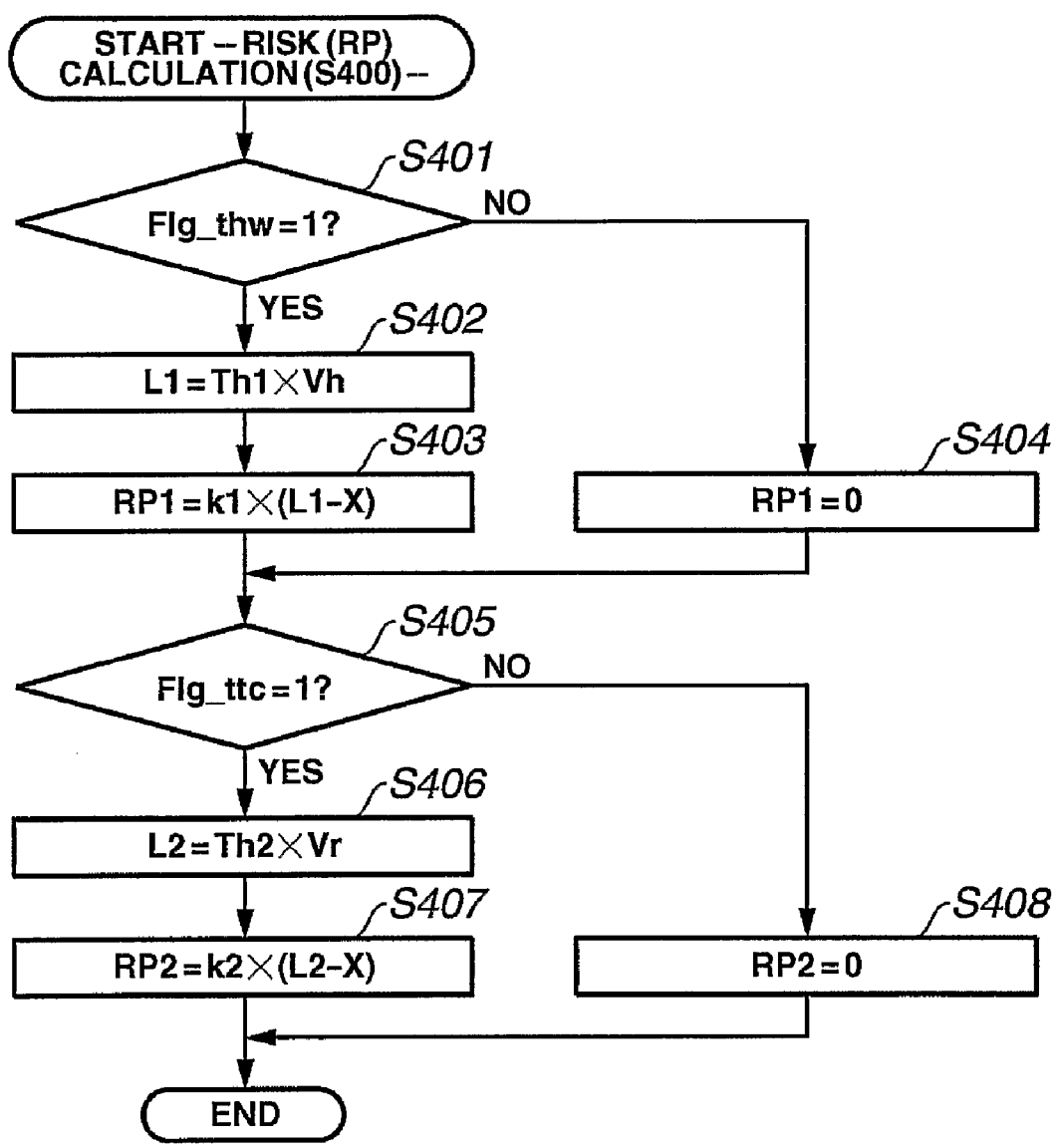
FIG. 14 is a flow chart of a risk (RP) calculation subroutine.

At step S400, the controller 50 executes a risk (RP) calculation sub-routine of FIG. 14 to determine a first risk RP1 upon determination that the detected obstacle is a target obstacle due to the fact that time headway THW is less than the first threshold value Th1, and also to determine a second risk RP2 upon determination that the detected obstacle is a target obstacle due to the fact that time to contact TTC is less than the second threshold value Th2. Referring to the state diagram of FIG. 29, it is now assumed that the vehicle 5 has two different imaginary elastic bodies extending from the front bumper forwardly toward the preceding vehicle.

Figure 29:
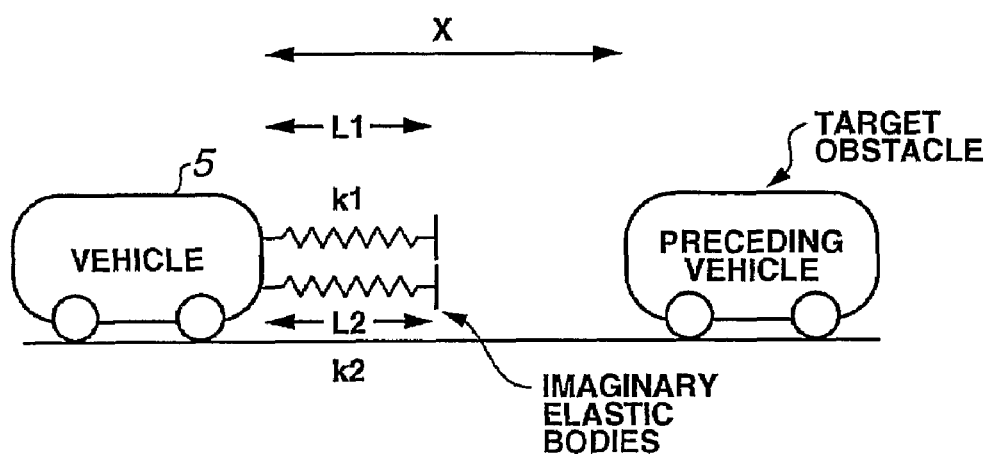
FIG. 29 is a state diagram of the vehicle, equipped with an embodiment of the system, traveling on a road with a preceding vehicle in front of the vehicle, illustrating the concept of two different imaginary elastic bodies used for calculation of two different risks (RP1, RP2) derived from the preceding vehicle and two different repulsive forces (Fc1, Fc2).

With continuing reference to FIG. 29, the risk (RP) calculation sub-routine shown in FIG. 14 is described.

In FIG. 14, at step S401, the controller 50 determines whether or not the THW target flag Flg_thw is equal to 1. If this is the case, the routine proceeds to step S402 because the detected obstacle is a target object.

At step S402, the controller 50 determines an unstressed length L1 of a first one of the two different imaginary elastic bodies using the first threshold value Th1 and the vehicle speed Vh. The unstressed length L1 may be expressed as:

$$L1 = Th1 \times Vh \quad \text{(Equation 4)}$$

At step S403, the controller 50 determines the first risk RP1, which may be expressed as:

$$RP1 = k1 \times (L1 - X). \quad \text{(Equation 5)}$$

where: k1 is a spring constant of the first imaginary elastic body.

If, at step S401, the THW target flag Flg_thw is 0, the routine proceeds to step S404 because the detected obstacle is not a target obstacle. At step S404, the controller 50 sets the first risk RP1 to 0 (RP1=0). As mentioned before, the first risk RP1 may be called a stable risk. After step S403 or S404, the routine proceeds to step S405.

At step S405, the controller 50 determines whether or not the TTC target flag Flg_ttc is equal to 1. If this is the case, the routine proceeds to step S406 because the detected obstacle is a target object.

At step S406, the controller 50 determines an unstressed length L2 of a second one of the two different imaginary elastic bodies using the second threshold value Th2 and the relative vehicle speed Vr. The unstressed length L2 may be expressed as:

$$L2 = Th2 \times Vr \quad \text{(Equation 6)}$$

At step S407, the controller 50 determines the second risk RP2, which may be expressed as:

$$RP2 = k2 \times (L2 - X) \quad \text{(Equation 7)}$$

where: k2 is a spring constant of the second imaginary elastic body.

If, at step S405, the TTC target flag Flg_ttc is 0, the routine proceeds to step S408 because the detected obstacle is not a target obstacle. At step S408, the controller 50 sets the second risk RP2 to 0 (RP2=0). As mentioned before, the second risk RP2 may be called a transient risk. After step S407 or S408, the routine proceeds to step S500 (see FIG. 10).

Figure 15:
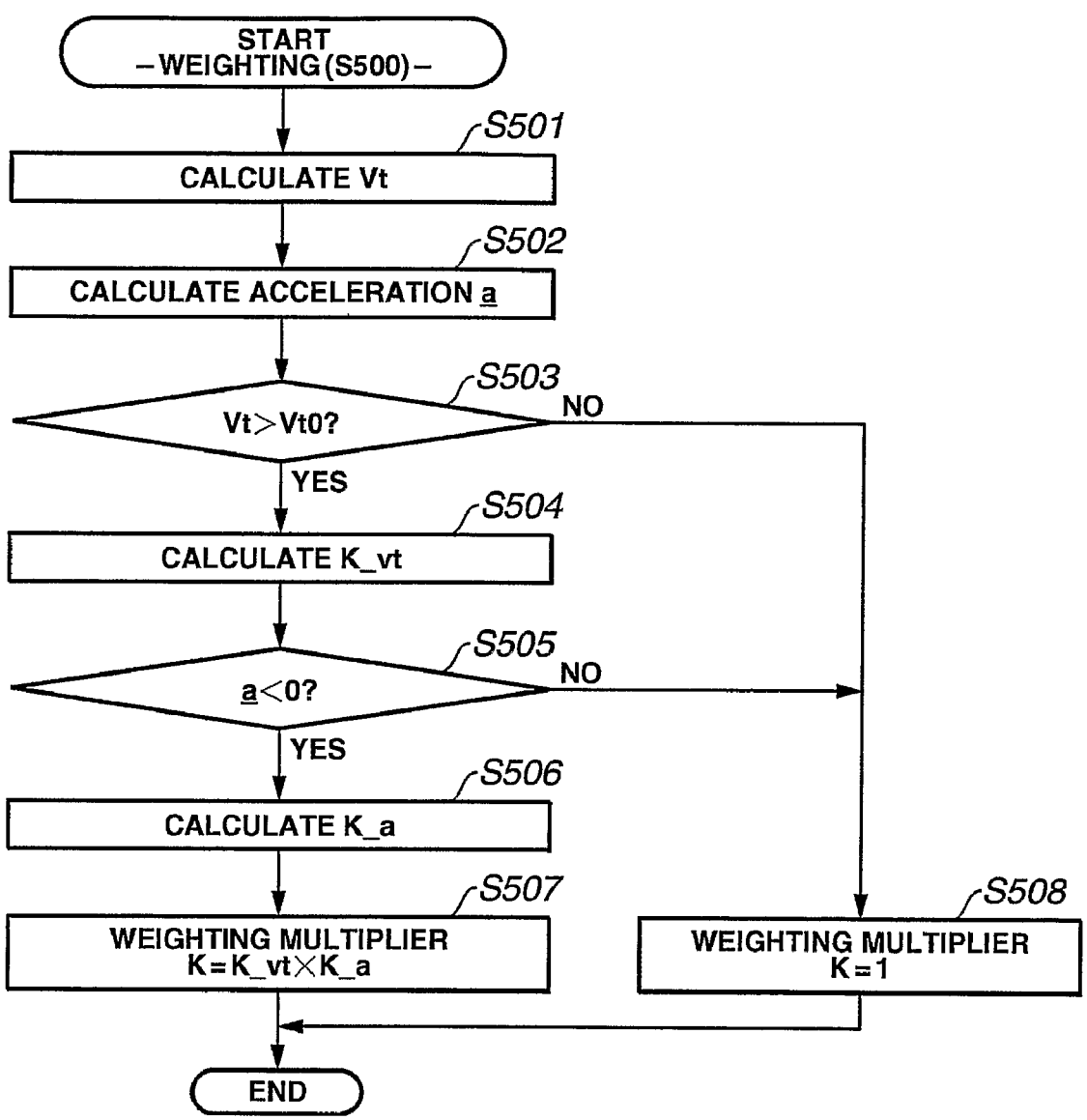
FIG. 15 is a flow chart of a weighting subroutine.
Figure 16:
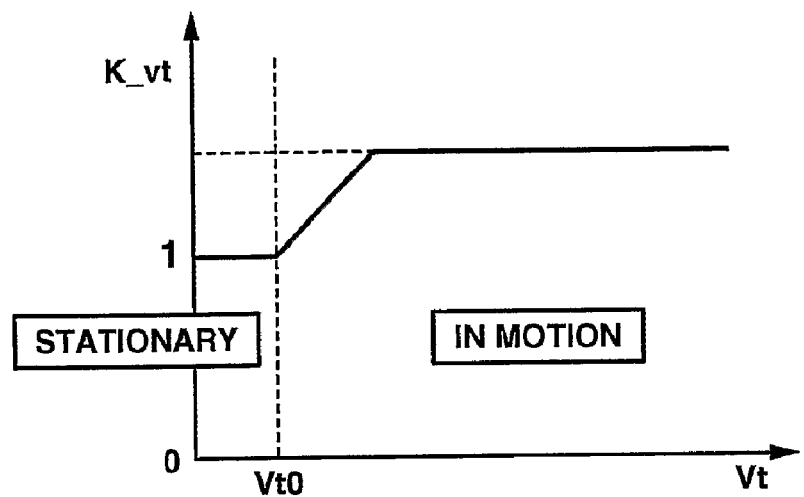
FIG. 16 shows varying of a weighting multiplier with different values of a vehicle speed of the preceding vehicle.
Figure 17:
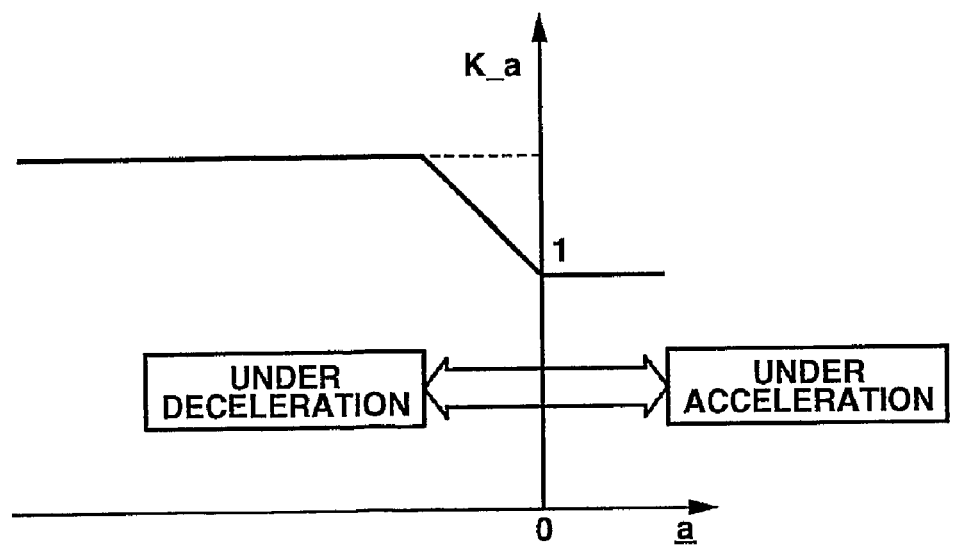
FIG. 17 shows varying of another weighting multiplier with different values of an acceleration of the preceding vehicle.

At step S500, the controller 50 executes a weighting sub-routine of FIG. 15 to determine an appropriate weighting for clear transmission of the second or transient risk RP2 to the driver of the vehicle 5 via reaction force inputs from the accelerator pedal 62 and brake pedal 92. Specifically, the controller 50 determines a weighting multiplier K.

In FIG. 15, at step S501, the controller 50 calculates a vehicle speed Vt of the preceding vehicle in front of the vehicle 5 by processing the data obtained at step S100. At step S502, the controller 50 calculates an acceleration, a, of the preceding vehicle by processing the present and past data of the vehicle speed Vt. At step S503, the controller determines whether the vehicle speed Vt of the preceding vehicle is greater than a predetermined vehicle speed value of, for example, 5 km/h. If this is the case, the controller 50 determines that the preceding vehicle is in motion and the routine proceeds to step S504. At step S504, the controller 50 determines a weighting multiplier value K_vt versus the vehicle speed Vt of the preceding vehicle by using the illustrated relationship in FIG. 16. The solid line in FIG. 16 clearly shows that the weighting multiplier value K_vt gradually increases from the value of 1 as the vehicle speed Vt of the preceding vehicle increases beyond the predetermined vehicle speed value Vt0. After step S504, the routine proceeds to step S505.

At step S505, the controller determines whether or not the acceleration a of the preceding vehicle is less than 0. If this is the case, the controller determines that the preceding vehicle is under deceleration and the routine proceeds to step S506. At step S506, the controller 50 determines another weighting multiplier value K_a versus the acceleration a of the preceding vehicle by using the illustrated relationship in FIG. 17. The solid line in FIG. 17 clearly shows that the weighting multiplier value K_a gradually increases from the value of 1 as the acceleration a decreases after it has become less than 0.

At the next step S507, the controller 50 determines the weighting multiplier K as the product of the multiplier values of K_vt and K_a. The weighting multiplier K may be expressed as:

$$K = K\_vt \times K\_a \quad \text{(Equation 8)}$$

The routine proceeds to step S508 from step S503 or step S505 if the interrogation results are negative. At step S508, the controller 50 sets the weighting multiplier K to 1.

After determining the weighting multiplier K, the routine proceeds from step S500 to step S600.

Figure 18:
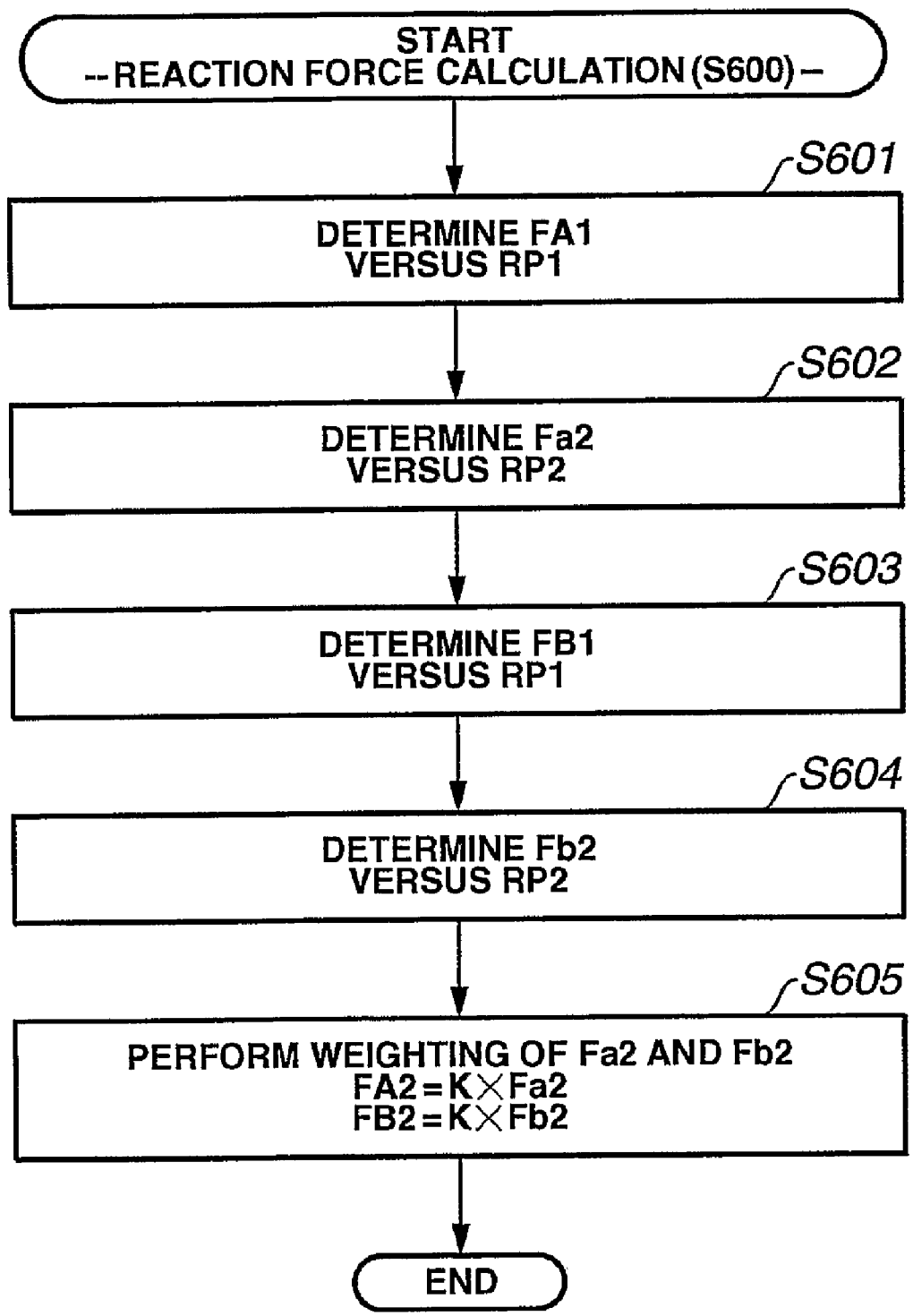
FIG. 18 is a flow chart of a reaction force calculation subroutine.

At step S600, the controller 50 executes a reaction force calculation sub-routine of FIG. 18 to determine, as variables, first accelerator pedal and brake pedal reaction force values FA1, FB1 and the weighted second accelerator pedal and brake pedal reaction force values FA2 and FB2.

Figure 19:
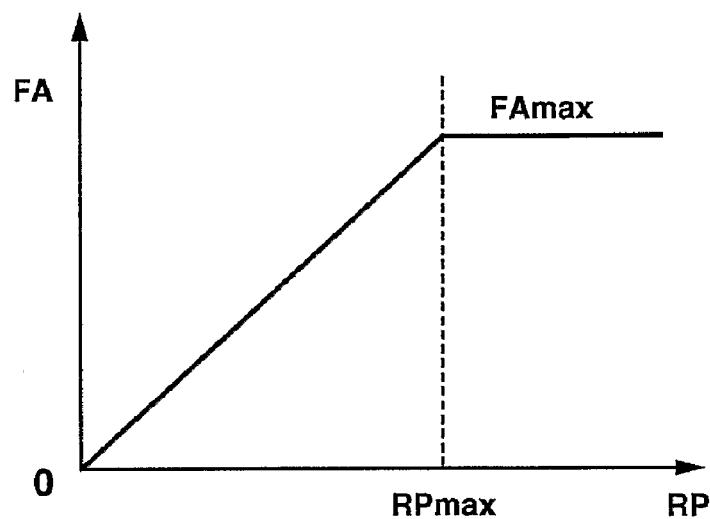
FIG. 19 shows varying of an accelerator pedal reaction force (FA) with different values of the risk (RP).

In FIG. 18, at step S601, the controller 50 determines a first accelerator pedal reaction force value FA1 versus the first or stable risk RP1 by using the relationship illustrated in FIG. 19. The solid line in FIG. 19 clearly shows that the accelerator pedal reaction force value FA is proportional to the risk RP over a range where the risk RP is less than a predetermined value RPmax but not less than 0 (zero). After the risk RP has reached the predetermined value RPmax, the accelerator pedal reaction force value FA is fixed to a predetermined maximum value FAmax and thus invariable with different values of risk RP greater than the predetermined value RPmax.

At step S602, the controller 50 determines a second accelerator pedal reaction force value Fa2 versus the second or transient risk RP2 by using the relationship illustrated in FIG. 19.

Figure 20:
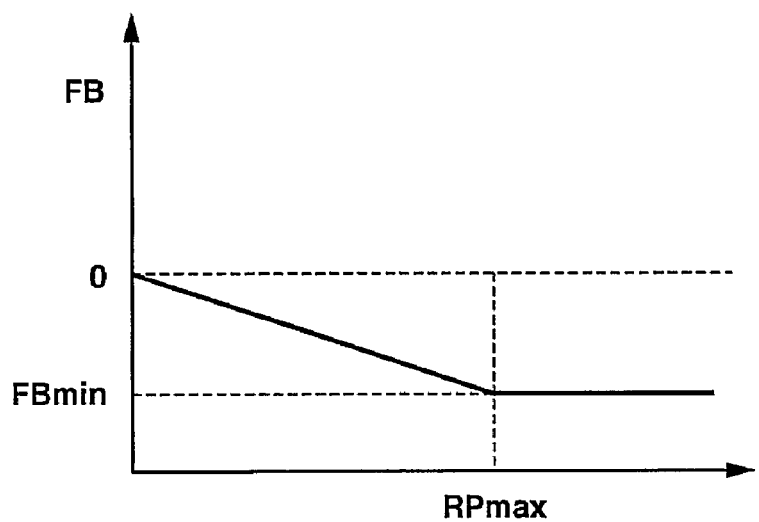
FIG. 20 shows varying of a brake pedal reaction force (FB) with different values of the risk (RP).

At step S603, the controller 50 determines a first brake pedal reaction force value FB1 versus the first or stable risk RP1 by using the relationship illustrated in FIG. 20. The solid line in FIG. 20 clearly shows that the brake pedal reaction force value FB is inversely proportional to the risk RP over a range where the risk RP is less than the predetermined value RPmax but not less than 0 (zero). After the risk RP has reached the predetermined value RPmax, the brake pedal reaction force value FB is fixed to a predetermined minimum value FAmax and thus invariable with different values of risk RP greater than the predetermined value RPmax.

At step S604, the controller 50 determines a second brake pedal reaction force value Fb2 versus the second or transient risk RP2 by using the relationship illustrated in FIG. 20.

As is readily seen from FIG. 19, when the risk RP is less than the predetermined value RPmax, varying of the risk RP is transmitted to the driver via one of different reaction force values from the accelerator pedal. On the other hand, when the risk RP is greater than or equal to the predetermined value RPmax, the reaction force value is maximized, prompting the driver to releasing the accelerator pedal 62. At the same time, the brake pedal reaction force is minimized as shown in FIG. 20 to make it easy for the driver to step on the brake pedal 92.

At step S605, the controller 50 performs a weighting of each of the second accelerator pedal reaction force value Fa2 and second brake pedal reaction force value Fb2 to give a weighted second accelerator pedal reaction force value FA2 and a weighted second brake pedal reaction force value FB2. The weighted second accelerator pedal and brake pedal reaction force values FA2 and FB2 may be expressed as:

$$FA2 = K \times Fa2 \quad \text{(Equation 9)}$$

$$FB2 = K \times Fb2 \quad \text{(Equation 10)}$$

After determining the first and the weighted second accelerator pedal and brake pedal reaction force values FA1, FB1, FA2 and FB2 at step S600, the routine proceeds to step S700.

Figure 21:
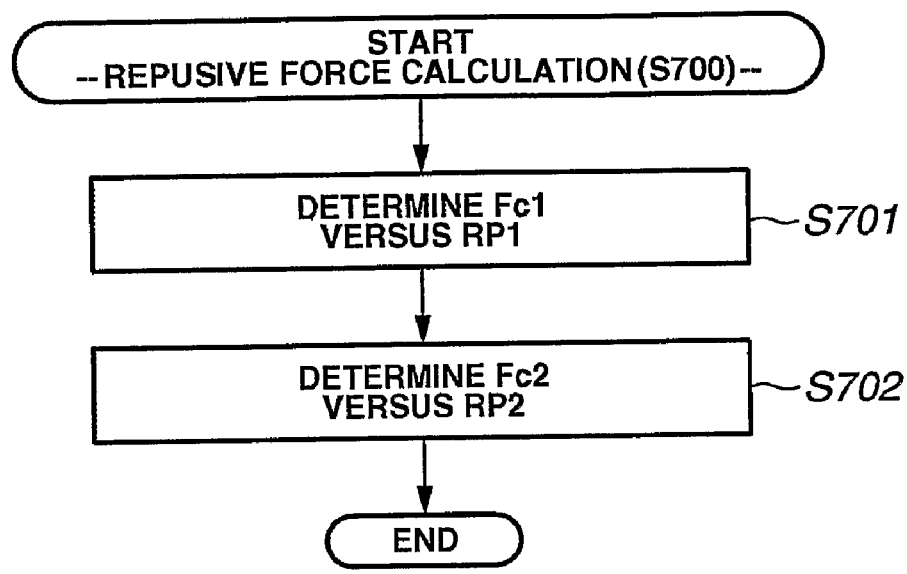
FIG. 21 is a flow chart of a repulsive force calculation subroutine.

At step S700, the controller 50 executes a repulsive force calculation sub-routine of FIG. 21.

Figure 22:
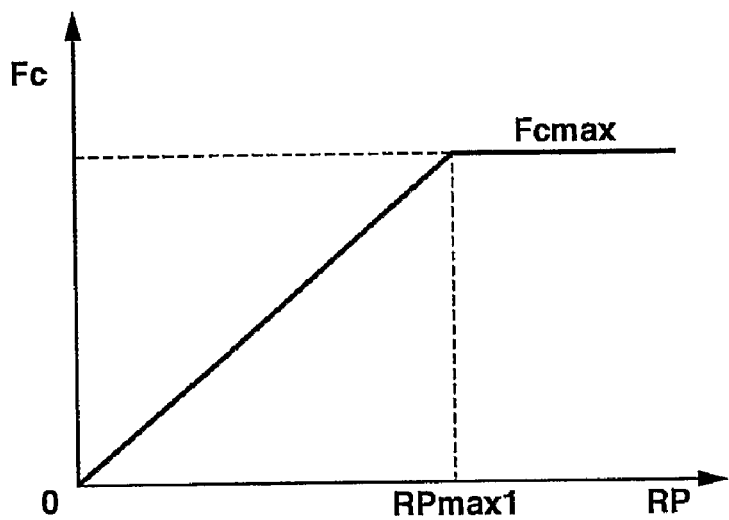
FIG. 22 shows varying of a repulsive force (Fc) with different values of the risk (RP).

In FIG. 21, at step S701, the controller 50 determines, as a variable, a first repulsive force value Fc1 versus the first or stable risk RP1 by using the relationship illustrated in FIG. 22. The solid line in FIG. 22 clearly shows that the repulsive force Fc is proportional to the risk RP over a range where the risk RP is less than a predetermined value RPmaxl but not less than 0 (zero). After the risk RP has reached the predetermined value RPmaxl, the repulsive force Fc is fixed to a predetermined maximum value Fcmax and thus invariable with different values of risk RP greater than the predetermined value RPmax1.

At the next step S702, the controller 50 determines, as a variable, a second repulsive force value Fc2 versus the second or transient risk RP2 by using the relationship illustrated in FIG. 22.

After determining the repulsive force values Fc1 and Fc2 at step S700, the routine proceeds to step S800.

Figure 23:
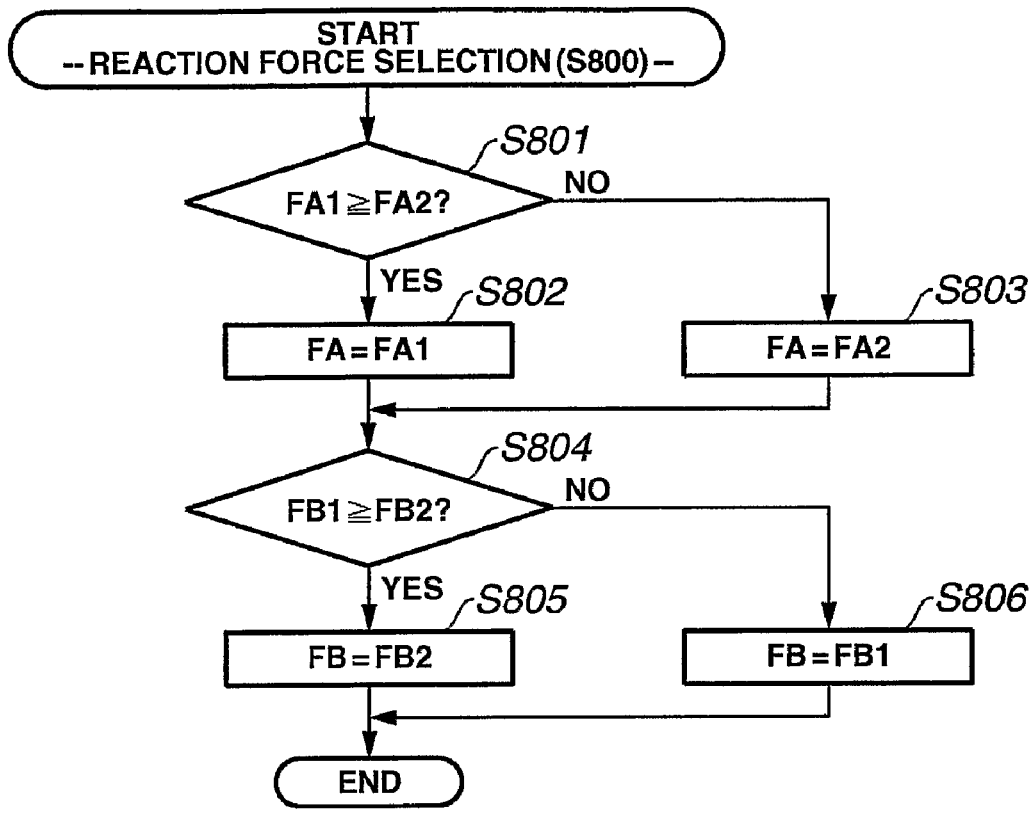
FIG. 23 is a flow chart of a reaction force selection subroutine.

At step S800, the controller 50 executes a reaction force selection sub-routine of FIG. 23.

In FIG. 23, at step S801, the controller 50 determines whether or not the first accelerator pedal reaction force value FA1 is greater than or equal to the weighted second accelerator pedal reaction force value FA2. If this is the case, the routine proceeds to step S802. At step S802, the controller 50 selects the first accelerator pedal reaction force value FA1 as an accelerator pedal reaction force indicative final variable FA. If, at step S801, the first accelerator pedal reaction force value FA1 is less than the weighted second accelerator pedal reaction force value FA2, the routine proceeds to step S803. At step S803, the controller 50 selects the weighted second accelerator pedal reaction force value FA2 as the final variable FA. After selecting the greatest or highest one among a set of reaction force values including the first accelerator pedal reaction force value FA1 and the weighted second accelerator pedal reaction force value FA2 as the final variable FA, the routine proceeds to step S804.

At step S804, the controller 50 determines whether or not the first brake pedal reaction force value FB1 is greater than or equal to the weighted second brake pedal reaction force value FB2. If this is the case, the routine proceeds to step S805. At step S805, the controller 50 selects the weighted second brake pedal reaction force value FB2 as a brake pedal reaction force indicative final variable FB. If, at step S804, the first brake pedal reaction force value FB1 is less than the weighted second brake pedal reaction force value FB2, the routine proceeds to step S806. At step S806, the controller 50 selects the first brake pedal reaction force value FB1 as the final variable FB. After selecting the lowest one among a set of reaction force values including the first brake pedal reaction force value FB1 and the weighted second brake pedal reaction force value FB2 as the final variable FB, the routine proceeds to step S900.

Figure 24:
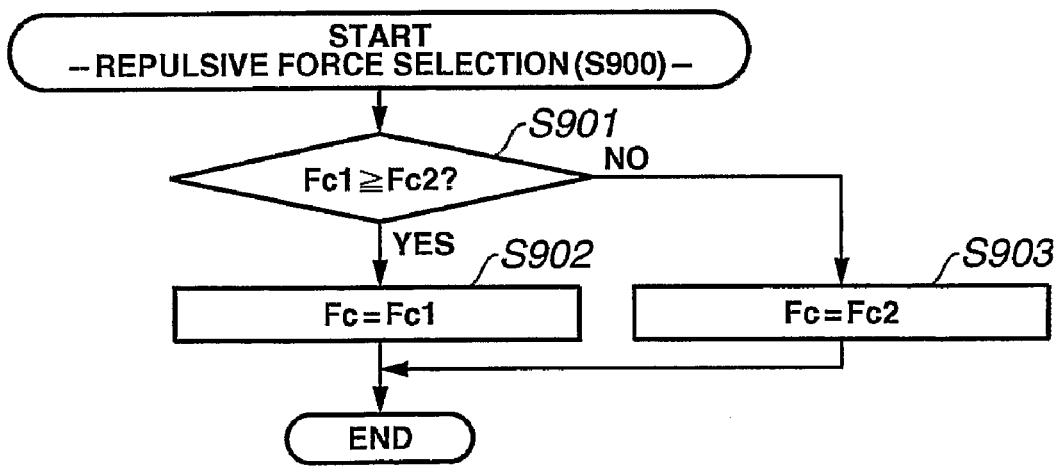
FIG. 24 is a flow chart of a repulsive force selection subroutine.

At step S900, the controller 50 executes a repulsive force selection sub-routine of FIG. 24.

In FIG. 24, at step S901, the controller 50 determines whether or not the first repulsive force value Fc1 is greater than or equal to the second repulsive force value Fc2. If this is the case, the routine proceeds to step S902. At step S902, the controller 50 selects the first repulsive force value Fc1 as a repulsive force indicative final variable Fc. If, at step S901, the first repulsive force value Fc1 is less than the second repulsive force value Fc2, the routine proceeds to step S903. At step S903, the controller 50 selects the second repulsive force value Fc2 as the final variable Fc. After selecting the greatest one among a set of repulsive force values including the first repulsive force value Fc1 and the second repulsive force value Fc2 as the final variable Fc, the routine proceeds to step S1000.

Figure 25:
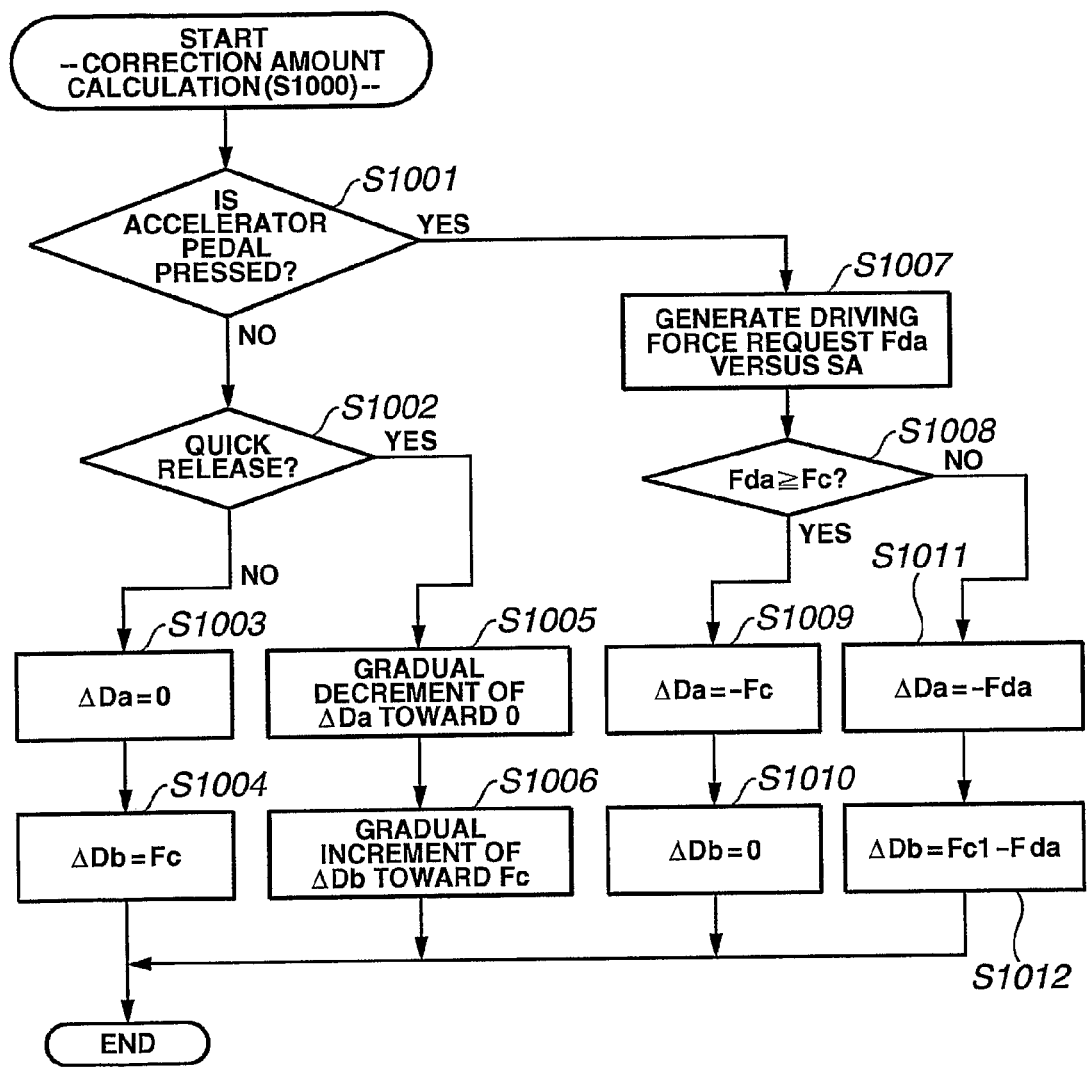
FIG. 25 is a flow chart of a correction amount calculation subroutine.
Figure 26:
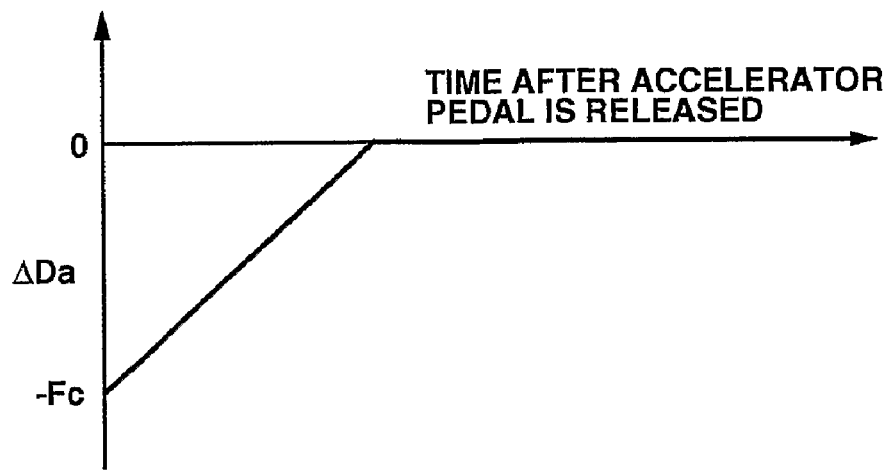
FIG. 26 shows varying of a driving force correction amount with elapse of time after release of an accelerator pedal.
Figure 27:
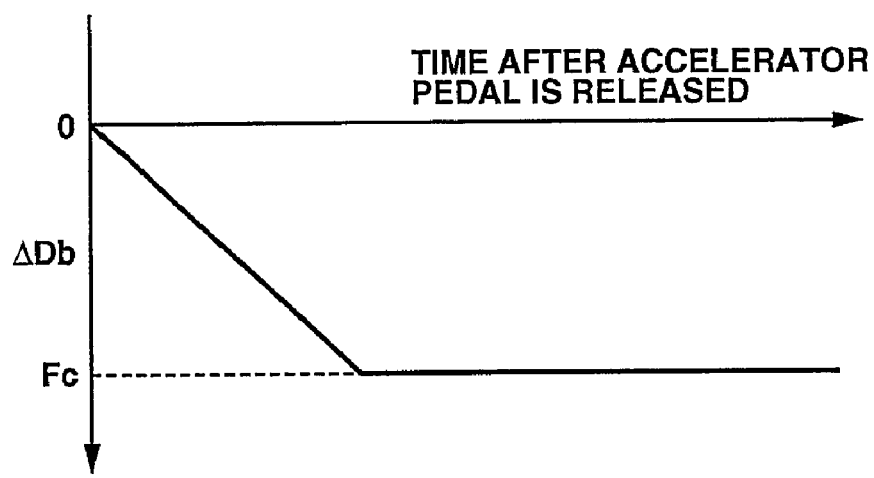
FIG. 27 shows varying of a braking force correction amount with elapse of time after release of the accelerator pedal.

At step S1000, the controller 50 executes a correction amount calculation sub-routine of FIG. 25.

In FIG. 25, at step S1001, the controller 50 determines whether or not the accelerator pedal 62 is pressed from the driver power demand SA from the accelerator pedal stroke sensor 64. If the accelerator pedal 62 is not pressed, the routine proceeds to step S1002. At step S1002, the controller 50 determines whether or not the accelerator pedal 62 has been released quickly. This determination is made by comparing operation speed of the accelerator pedal 62 to a predetermined value. The operation speed may be calculated from a time rate of change in driver power demand SA from the accelerator pedal stroke sensor 64. If, at step S1002, the controller 50 determines that the accelerator pedal 62 has been slowly released, the routine proceeds to step S1003. At step S1003, the controller 50 sets a driving force correction amount $\Delta Da$ to 0 ($\Delta Da = 0$). At the next step S1004, the controller 50 sets a braking force correction amount $\Delta Db$ to the repulsive force indicative final variable Fc.

If, at step S1002, the controller 50 determines that the accelerator pedal 62 has been quickly released, the routine proceeds to step S1005. At step S1005, the controller 50 carries out a decrement of the driving force correction amount $\Delta Da$ for gradual decrement of the driving force correction amount $\Delta Da$ toward 0. At the next step S1006, the controller 50 carries out an increment of the braking force correction amount $\Delta Db$ for gradual increment of the braking force correction amount $\Delta Db$ toward the final variable Fc.

If, at step S1001, the controller 50 determines that the accelerator pedal 62 is pressed, the routine proceeds to step S1007. At step S1007, the controller 50 determines a driving force request Fda versus driver power demand SA by using the relationship illustrated in FIG. 6 and generates the determined driving force request Fda.

At the next step S1008, the controller 50 determines whether or not the driving force request Fda is greater than or equal to the repulsive force control value Fc. If this is the case, the routine proceeds to step S1009. At step S1009, the controller 50 sets the driving force correction amount $\Delta Da$ to $-Fc$ ($\Delta Da = -Fc$). At the next step S1010, the controller 50 sets the braking force correction amount $\Delta Db$ to 0 ($\Delta Db = 0$). In this case, the driver feels acceleration less than expected because the driving force request Fda still remains after it has been reduced by Fc.

If, at step S1008, the controller 50 determines that the driving force request Fda is less than the final variable Fc, the routine proceeds to step S1011. At step S1011, the controller 50 sets the driving force correction amount $\Delta Da$ to $-Fda$ ($\Delta Da = -Fda$). At the next step S1012, the controller 50 sets the braking force correction amount $\Delta Db$ to a compensation (Fc−Fda) for a shortage in the driving force correction amount. In this case, the driver feels deceleration.

Figure 28:
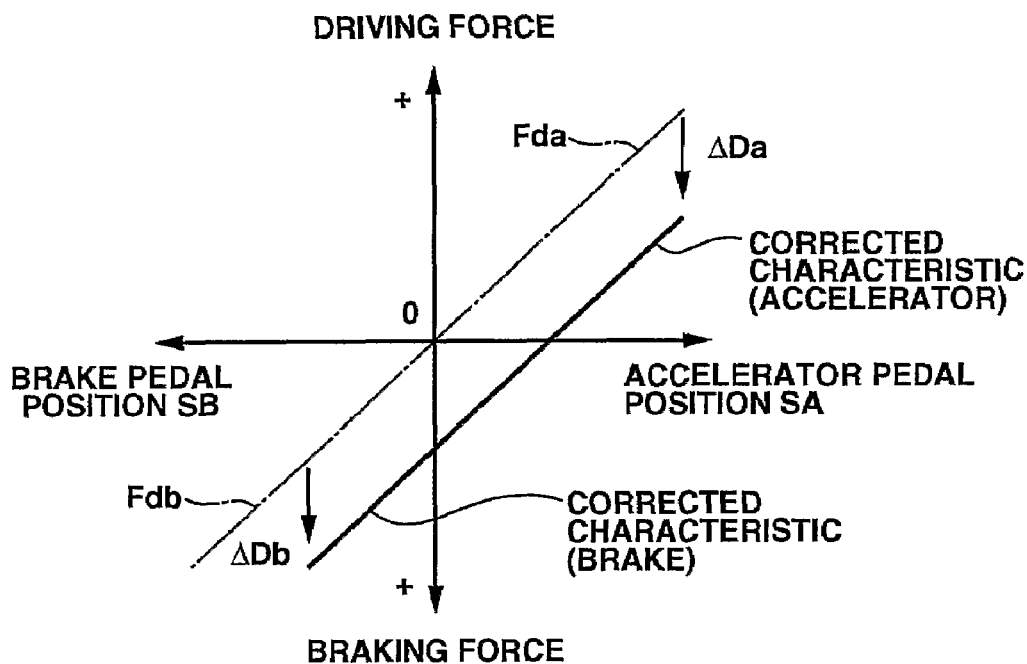
FIG. 28 shows, in solid lines, the corrected versions of the normal driving force request (Fda) versus accelerator pedal position (SA) characteristic and the normal braking force request (Fdb) versus brake pedal position (SB), respectively, shown, in a one-dot chain line.

FIG. 28 illustrates the manner of correcting driving force and braking force. In FIG. 28, the horizontal axis represents the accelerator pedal position or driver power demand SA and the brake pedal position or driver brake demand SB. The driver power demand SA increases from the origin 0 in a right-hand direction. The driver brake demand SB increases from the origin 0 in a left-hand direction. The vertical axis represents the driving force and the braking force. The driving force increases from the origin 0 in an upward direction. The braking force increases from the origin 0 in a downward direction.

In FIG. 28, the one-dot chain line indicates varying of driving force request Fda with different values of accelerator pedal position SA and varying of braking force request Fdb with different values of brake pedal position SB.

The solid line indicates varying of driving and braking force requests as corrected by the correction amounts $\Delta Da$ and $\Delta Db$.

When the driving force request Fda is greater than the repulsive force indicative final variable Fc, the driving force request Fda is decreased simply by the driving force correction amount $\Delta Da$ ($= -Fc$).

When the driving force request Fda is less than the final variable Fc, the driving force request Fda is decreased by the driving force correction amount ΔDa (=−Fda), leaving no driving force request. The braking force correction amount ΔDb is set to a difference between the final variable Fc and the driving force request Fda. In this case, the driver feels less rapid deceleration corresponding to restrained driver power demand SA.

After calculating the driving force and braking force correction amounts ΔDa and ΔDb, the routine proceeds to step S1100.

Turning back to FIG. 10, at step S1100, the controller 50 provides the accelerator pedal reaction force indicative final variable FA and the brake pedal reaction force indicative final variable FB to the accelerator pedal reaction force controller 60 and the brake pedal reaction force controller 90, respectively (see FIG. 1). The accelerator pedal reaction force controller 60 regulates a reaction force from the accelerator pedal 62 in accordance with the final variable FA. The brake pedal reaction force controller 90 regulates a reaction force from the brake pedal 92 in accordance with the final variable FB.

At the next step S1200, the controller 50 provides the driving force correction amount ΔDa and braking force correction amount ΔDb to the driving force controller 63 and braking force controller 93, respectively. The driving force controller 63 calculates a target driving force based on the driving force correction amount ΔDa and the driving force request Fda, and controls the engine to generate the target driving force. The braking force controller 93 calculates a target braking force based on the braking force correction amount ΔDb and driving force request Fdb, and controls a hydraulic brake fluid pressure to generate the target braking force.

With reference now to FIG. 29 and FIGS. 30(a) to 30(f), the embodiment of the method and system according to the present invention can best be explained.

FIG. 29 shows first and second imaginary elastic bodies extending from the vehicle 5 toward the preceding vehicle in front of the vehicle 5. The first imaginary elastic body has an unstressed length L1 and a spring constant k1, while the second imaginary elastic body has an unstressed length L2 and a spring constant k2. When the first imaginary elastic body is compressed between the vehicle 5 and the preceding vehicle, the first or stable risk RP1 is generated. When the second imaginary elastic body is compressed between the vehicle 5 and the preceding vehicle, a second or transient risk RP2 is generated.

Figure 30A:
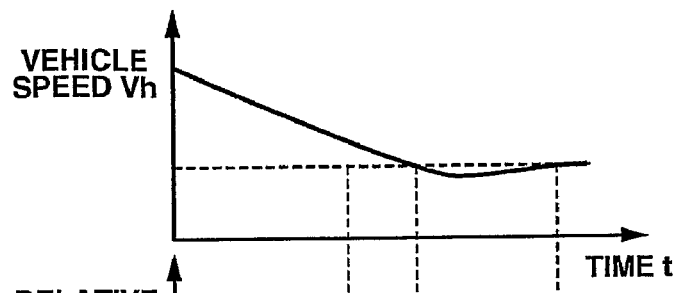
FIGS. 30(a) to 30(f) are time charts illustrating the operation of the embodiment of the system according to the present invention.
Figure 30B:
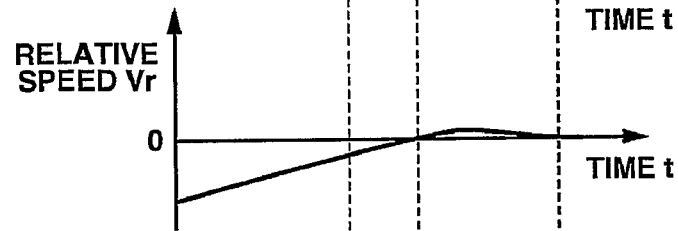
Figure 30C:
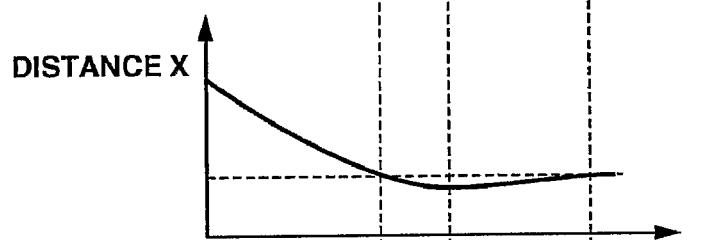
Figure 30D:
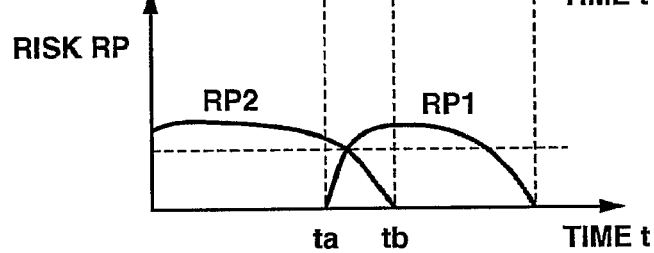

FIGS. 30(a) to 30(c) are time charts illustrating the state of the vehicle 5 approaching and then following the preceding vehicle in front, with varying of vehicle speed Vh, relative speed Vr, distance X, risks RP1 & RP2, repulsive force indicative final variable Fc, and accelerator pedal reaction indicative final variable FA.

As shown in FIGS. 30(a), 30(b) and 30(c), the vehicle speed Vh and distance X gradually decrease, while the relative speed Vr gradually increases. Specifically, at or immediately after moment ta, the distance X becomes equal to or less than a predetermined distance. Subsequently, at or immediately after moment tb, relative speed Vr becomes equal to or greater than zero. After the moment ta, the distance X stays less than the predetermined distance until it converges into the predetermined distance.

Until the moment tb, relative speed Vr stays less than 0 and continues to approach 0 at a gradual rate. The result of one analysis that the time to collision TTC stays less than Th2 (TTC<Th2) provides a transient period allowing determination of transient risk RP2. Partially overlapping the transient period, the result of another different analysis that the time headway THW stays less than Th1 (THW<Th1) provides a stable period allowing determination of stable risk RP1.

Figure 30E:
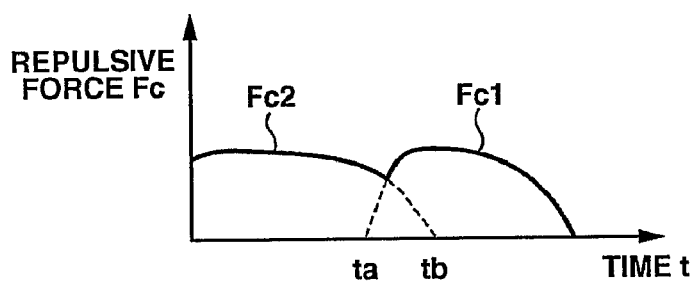

As shown in FIG. 30(e), the second repulsive force value Fc2 and the first repulsive force value Fc1 exist concurrently with the transient risk RP2 and the stable risk RP1, respectively. The fully drawn line in FIG. 30(e) shows varying of the repulsive force indicative final variable Fc obtained after the selection out of the repulsive force values Fc2 and Fc1.

Figure 30F:
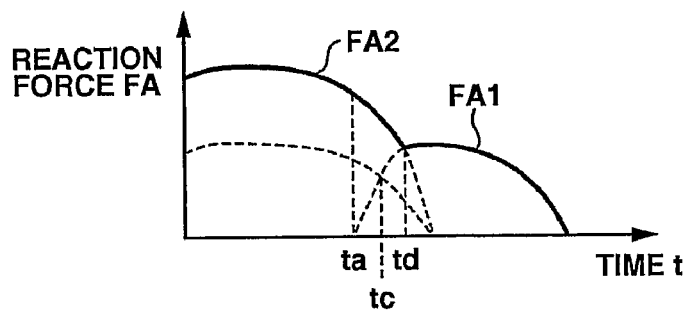

As shown in FIG. 30(f), the fully drawn line shows varying of the accelerator pedal reaction force indicative final variable FA obtained after the selection out of the weighted reaction force value FA2 and the reaction force value FA1.

In the case where the vehicle 5 is approaching the preceding vehicle, firstly, the weighted reaction force value FA2 is generated during the transient period before generation of the reaction force FA1 during the stable period. It is therefore possible to clearly transmit the transient risk RP2 at an early stage of approaching the preceding vehicle. The repulsive force value Fc2 is not weighted so as to prevent excessive correction of driving force and/or braking force.

An increase in relative speed Vr due to a change in the vehicle speed Vh of the vehicle 5 or the speed Vt of the preceding vehicle can be clearly transmitted to the driver because the reaction force value Fa2 is weighted before being transmitted.

The embodiment can be appreciated again from reading the following description:

(1) With reference to FIG. 9, the first target discrimination device 51a determines whether or not the detected obstacle is a target obstacle based on a distance X between the vehicle 5 and the detected obstacle and a speed Vh of the vehicle 5. The first or stable risk (RP) calculation device 52a determines a first or stable risk RP1 upon determination by the first target discrimination device 51a that the detected obstacle is the target obstacle. In response to the stable risk RP1, the first reaction force calculation device 54a determines first accelerator and brake pedal reaction force values FA1 and FB1.

The second target discrimination device 51b determines whether or not the detected obstacle is a target obstacle based on the distance X and a relative speed Vr between the vehicle 5 and the detected obstacle. The second or transient risk (RP2) calculation device 52 determines a second or transient risk RP2 upon determination by the second target discrimination device 51b that the detected obstacle is the target obstacle. In response to the transient risk RP2, the second reaction force calculation device 54b determines second accelerator and brake pedal reaction force values Fa2 and Fb2. The weighting device 53 performs a weighting of the second accelerator and brake pedal reaction force values Fa2 and Fb2 to give weighted second reaction force values FA2 and FB2.

The reaction force selection device 56 selects the greatest or highest one, in absolute value, among a set of reaction force values including the first accelerator pedal reaction force value FA1 and the weighted second accelerator pedal reaction force value FA2 and/or the greatest or highest one, in absolute value, among a set of reaction force values including the first brake pedal reaction force value FB1 and the weighted second brake pedal reaction force value FB2.

The controller 50 provides the selected ones, as final variables FA and FB, for adjustment of reaction forces from the driver controlled input devices toward the reaction force values indicated by the final variables FA and FB. This makes it possible to clearly transmit the transient risk RP2 to the driver well before transmission of the stable risk RP1.

(2) The first repulsive force calculation device 55a determines a first repulsive force value Fc1 versus the stable risk RP1. The second repulsive force calculation device 55b determines a second repulsive force value Fc2 versus the transient risk RP2. The repulsive force selection device 57 selects the larger one of the repulsive force values Fc1 and Fc2. The controller 50 provides the selected one, as final variable Fc, for an appropriate reduction in driving force as if it were caused due to occurrence of running resistance due to the repulsive force indicated by the final variable Fc. Acceleration/deceleration control caused due to this reduction in driving force provides a haptic input to the driver as a clear assist. Weighting is not performed in producing the repulsive force indicative final variable Fc in order to avoid an unnecessary large change in driving force control.

(3) As explained before in connection with FIG. 28, the controller 50 can correct, via the driving force controller 63, the driving force request Fda versus driver power demand SA characteristic in a direction of reducing driving force based on the repulsive force indicative final variable Fc. An appreciable drop in driving force occurs in response to increased possibility that the vehicle may contact with the detected obstacle, transmitting the increased possibility to the driver via a reduction in acceleration or deceleration.

(4) As explained before in connection with FIG. 28, the controller 50 can correct, via the braking force controller 93, the braking force request Fdb versus brake power demand SB characteristic in a direction of increasing braking force based on the repulsive force indicative final variable Fc. Increased possibility that the vehicle may contact with the detected obstacle is transmitted to the driver upon stepping on the brake pedal via an increase in braking force corresponding to a braking force correction amount ΔDb.

(5) The controller 50 performs a weighting of the second reaction force values Fa2 and Fb2 when both the stable risk RP1 and the transient risk RP2 are greater than or equal to a predetermined value. Referring to FIG. 30(d), in the embodiment, the controller 50 performs a weighting of the reaction force values Fa2 and Fb2 that are determined versus the transient risk RP2 during a time from ta to tb. The weighted second reaction force values FA2 and FB2 are selected in preference to the first reaction force values FA1 and FB1 determined versus the stable risk RP1, allowing the transient risk RP2 to be transmitted to the driver clearly.

(6) The controller 50 performs a weighting of the second reaction force values Fa2 and Fb2 when both the stable risk RP1 and the transient risk RP2 are greater than or equal to a predetermined value and the second reaction force values Fa2 and Fb2 determined versus the transient risk RP2 are greater, in absolute value, than the first reaction force values FA1 and FB1 determined versus the stable risk RP1. Referring to FIG. 30(f), in the exemplary embodiment, the controller 50 performs a weighting of the second reaction force values Fa2 and Fb2 during a time from ta to tc. The transient risk RP2 can be transmitted to the driver clearly and impressively via the weighted second reaction force values Fa2 and Fb2.

(7) The controller 50 performs a weighting of the second reaction force values Fa2 and Fb2 when both the stable risk RP1 and the transient risk RP2 are greater than or equal to a predetermined value and if the weighted second reaction force values FA2 and FB2 are greater than the first reaction force values FA1 and FB1. Referring to FIG. 30(f), in the exemplary embodiment, the controller 50 performs a weighting of the second reaction force values Fa2 and Fb2 during a time from ta to td. The weighted second reaction force values FA2 and FB2 determined versus the transient risk RP2 are selected in preference to the first reaction force values FA1 and FB1 determined versus the state risk RP1, allowing the transient risk RP2 to be transmitted to the driver clearly.

(8) The controller 50 performs a weighting of the second reaction force values Fa2 and Fb2 to give the weighted second reaction force values FA2 and FB2 upon recognition that the preceding vehicle is in motion or moving, making it possible to transmit to the driver an increased risk due to the preceding vehicle in motion.

(9) The controller 50 performs a weighting of the second reaction force values Fa2 and Fb2 to give the weighted second reaction force values FA2 and FB2 upon recognition that the preceding vehicle is under deceleration, making it possible to transmit to the driver an increased risk due to the preceding vehicle in motion.

(10) The first target discrimination device 51a determines that the detected obstacle is a target obstacle when a time headway (THW), which is obtained by dividing the distance by the vehicle speed, is less than a first threshold value Th1, and the second target discrimination device 51b determines that the detected obstacle is a target obstacle when a time to collision (TTC), which is obtained by dividing the distance by the relative vehicle speed, is less than a second threshold value Th2. Using different analyses provides enhanced target discrimination.

(11) The controller 50 regulates a reaction force from an accelerator pedal 62. Since the driver is in engagement with the accelerator pedal 62, risk RP1 or RP2 can be transmitted to the driver without any failure.

(12) The controller 50 regulates not only a reaction force from the accelerator pedal 62, but a reaction force from the brake pedal 92. The reaction force from the brake pedal 92 is reduced as the risk RP1 or RP2 become great, assisting the driver in operating the brakes by stepping on the brake pedal 92.

With reference now to FIGS. 31 to 33, another embodiment of a system, generally denoted by reference numeral 2, according to the present invention is described.

This embodiment is substantially the same as the previously described embodiment illustrated in FIGS. 1 to 30. However, this embodiment is different from the previously described embodiment in that a scene recognition device 8A includes an environment recognition device 30. The environment recognition device 30 is, for example, a navigation system, and detects whether or not a tunnel or curve is in the path of a vehicle 5. The environment recognition device 30 provides environment information to a controller 50A.

The block diagram of FIG. 32 illustrates the controller 50A. The controller 50A is substantially the same as the controller 50 of the previously described embodiment except that a modified weighting device 53A is used instead of the weighting device 53. At the modified weighting device 53A, a weighting multiplier K is determined based on environment information provided by the environment recognition device 30. In this embodiment, the weighting device 53A performs a weighting of second accelerator pedal and brake pedal reaction force values Fa2 and Fb2 determined versus a second or transient risk RP2 in response to environment information from the environment recognition device 30.

In this embodiment, the main routine, including the sub-routines, used in the previously described embodiment may be used if the "weighting (S500)" sub-routine of FIG. 15 is replaced by a "weighting (S500A)" sub-routine of FIG. 33. This sub-routine is executed at step S500 of the main routine shown in FIG. 10.

In FIG. 33, at step S511, a controller 50A determines whether or not there is a tunnel or curve in front of the vehicle 5. If this is the case, the routine proceeds to step S512. In the presence of a tunnel or curve in front of the vehicle 5, the driver is likely to keep less attention to the preceding vehicle than in the absence thereof. Thus, a weighting multiplier K is gradually increased to a predetermined value K0 that is greater than 1 (for example, K0=1.4). At step 512, the controller 50A determines whether or not the predetermined value K0 is greater than or equal to the value given by adding a predetermined increment ΔK to the multiplier K_z, which was given in the previous cycle.

If, at step S512, K0 is greater than or equal to the value (K_z+Δ K), the routine proceeds to step S513. At step S513, the controller 50A sets the multiplier K to (K_z+ΔK). If the result of interrogation at step S513 is negative, the routine proceeds to step S514. At step S514, the controller 50A sets the multiplier K to the predetermined value K0. If the result of interrogation at step S511 is negative, the routine proceeds to step S515. At step S515, the controller 50A sets the multiplier K to 1.

Using the multiplier K that has been set as mentioned above, the controller 50A performs a weighting of the reaction force values Fa2 and Fb2 that have been determined versus the second or transient risk RP2. The weighting is performed by multiplying K with the reaction value Fa2 to give FA2 and multiplying K with the reaction value Fb2 to give FB2.

According to this embodiment, the controller 50A performs a weighting of the second reaction force values Fa2 and Fb2 that have been determined versus second or transient risk RP2 upon recognition that there is a tunnel or curve in front of the vehicle 5. This makes it possible to clearly transmit the transient risk RP2 to the driver when the driver likely to pay less attention to the preceding vehicle in front.

Other examples of the surrounding environment are:
Night/day
Brightness
Weather (fine/rain or snow)

Time signal from the navigation system or a GPS receiver may be used to determine whether it is day or night. When it is night, the weighting multiplier K is set larger than during the day so that the transient risk RP2 can be clearly transmitted to the driver. An optical sensor or ON/OFF of a headlight may be used to detect brightness. The weighting multiplier K is set larger when it is dark than when it is bright. A rain sensor or ON/OFF of a windshield wiper may be used to detect whether. The weighting multiplier K is set larger when it is not fine than when it is fine.

With reference now to FIGS. 34 to 41, another embodiment is described. This embodiment is substantially the same as the previously described embodiment illustrated in FIGS. 1 to 30 except the addition of two subsystems.

As mentioned before, a controller 50B shown in FIG. 34 is different from the controller 50 shown in FIG. 9 in that the at least two subsystems include, in addition to the first and second subsystems, a third subsystem 51c, 52c, 54c, and 55c, and a fourth subsystem 51d, 52d, 54d, and 55d.

With reference to FIG. 34, the position X and azimuth angle θ between each of the detected obstacle(s) and the vehicle 5, and the vehicle speed Vh are fed to a first contact possibility discrimination device 51c of the third subsystem and a second contact possibility discrimination device 51d of the fourth subsystem. They are fed also to a third risk (RP) calculation device 52c of the third subsystem and to a fourth risk (RP) calculation device 52d of the fourth subsystem.

In the third subsystem, the first contact possibility discrimination device 51c determines whether or not a vehicle 5 may come into contact with the detected obstacle by effecting a first contact possibility discrimination based on the vehicle speed Vh of the vehicle 5 and a distance X to the detected obstacle from the vehicle 5. Specifically, the first contact possibility discrimination device 51c determines that the vehicle 5 may contact with the detected obstacle when the time headway THW is less than a third threshold Th3. This threshold Th3 is less than the first threshold value Th1. Upon determination that the vehicle may contact with the detected obstacle, the first contact possibility discrimination device 51c activates a third risk (RP) calculation device 52c, a third reaction force calculation device 54c, and a third repulsive force calculation device 55c. Using the illustrated relationships in FIGS. 19 and 20, the third reaction force calculation device 54c determines, as variables, a third accelerator pedal reaction force value FA3 versus the third risk RP3 and a third brake pedal reaction force value FB3 versus the third risk RP3. Using the illustrated relationship in FIG. 22, the third repulsive force calculation device 55c determines, as a variable, a third repulsive force value Fc3 versus the third risk RP3.

In the fourth subsystem, the second contact possibility discrimination device 51d determines whether or not the vehicle 5 may come into contact with the detected obstacle by effecting a second contact possibility discrimination based on the relative vehicle speed Vr and the distance X. Specifically, the second contact possibility discrimination device 51d determines that the vehicle 5 may contact with the detected obstacle when the time to collision TTC is less than a fourth threshold value Th4 that is less than the second threshold value Th2. Upon determination that the vehicle may contact the detected obstacle, the second contact possibility discrimination device 51d activates a fourth risk (RP) calculation device 52d, a fourth reaction force calculation device 54d, and a fourth repulsive force calculation device 55d. The fourth risk calculation device 52d determines a fourth risk RP4 from the detected obstacle upon determination, by the second contact possibility discrimination device 51d, that the vehicle 5 may come into contact with the detected obstacle. Using the illustrated relationships in FIGS. 19 and 20, the fourth reaction force calculation device 54d determines, as variables, a fourth accelerator pedal reaction force value FA4 versus the fourth risk RP4 and a fourth brake pedal reaction force value FB4 versus the fourth risk RP4. Using the illustrated relationship in FIG. 22, the fourth repulsive force calculation device 55d determines, as a variable, a fourth repulsive force value Fc4 versus the fourth risk RP4.

Determination of the third risk RP3 is allowed during a portion of the stable period provided by the first target discrimination device 51a. Determination of the second risk RP2 is allowed during a portion of the transient period provided by the second target discrimination device 51b.

The third and fourth accelerator pedal reaction force values FA3 and FA4 are fed to a reaction force selection device 56 in addition to the first and the weighted second accelerator pedal reaction force values FA1 and FA2. The third and fourth brake pedal reaction force values FB3 and FB4 are fed to the reaction force selection device 56 in addition to the first and the weighted second brake pedal reaction force values FB1 and FB2. Following a predetermined rule, the reaction force selection device 56 selects an appropriate one of the first to fourth accelerator pedal reaction force values FA1, FA2, FA3, FA4 and provides the selected one, as an accelerator pedal reaction force (APRF) indicative final variable FA. The final variable FA is fed to an accelerator pedal reaction force controller 60 (see FIG. 1). In the same manner, the reaction force selection device 56 selects one of the first to fourth brake pedal reaction force values FB1, FB2, FB3, FB4 and provides the selected one as a brake pedal reaction force (BPRF) indicative final variable FB. The final variable FB is fed to a brake pedal reaction force controller 90 (see FIG. 1).

The third and fourth repulsive force values Fc3 and Fc4 are fed to a repulsive force selection device 57 in addition to the first and second repulsive force values Fc1 and Fc2. The repulsive force selection device 57 selects an appropriate one of the first to fourth repulsive force values Fc1, Fc2, Fc3, Fc4, and provides the selected one, as a repulsive force (RF) indicative final variable Fc. The final variable Fc is fed to a correction amount calculation device 58.

In the exemplary embodiment, the controller 50B implements all of the devices of the block diagram shown in FIG. 34 in software.

Figure 35:
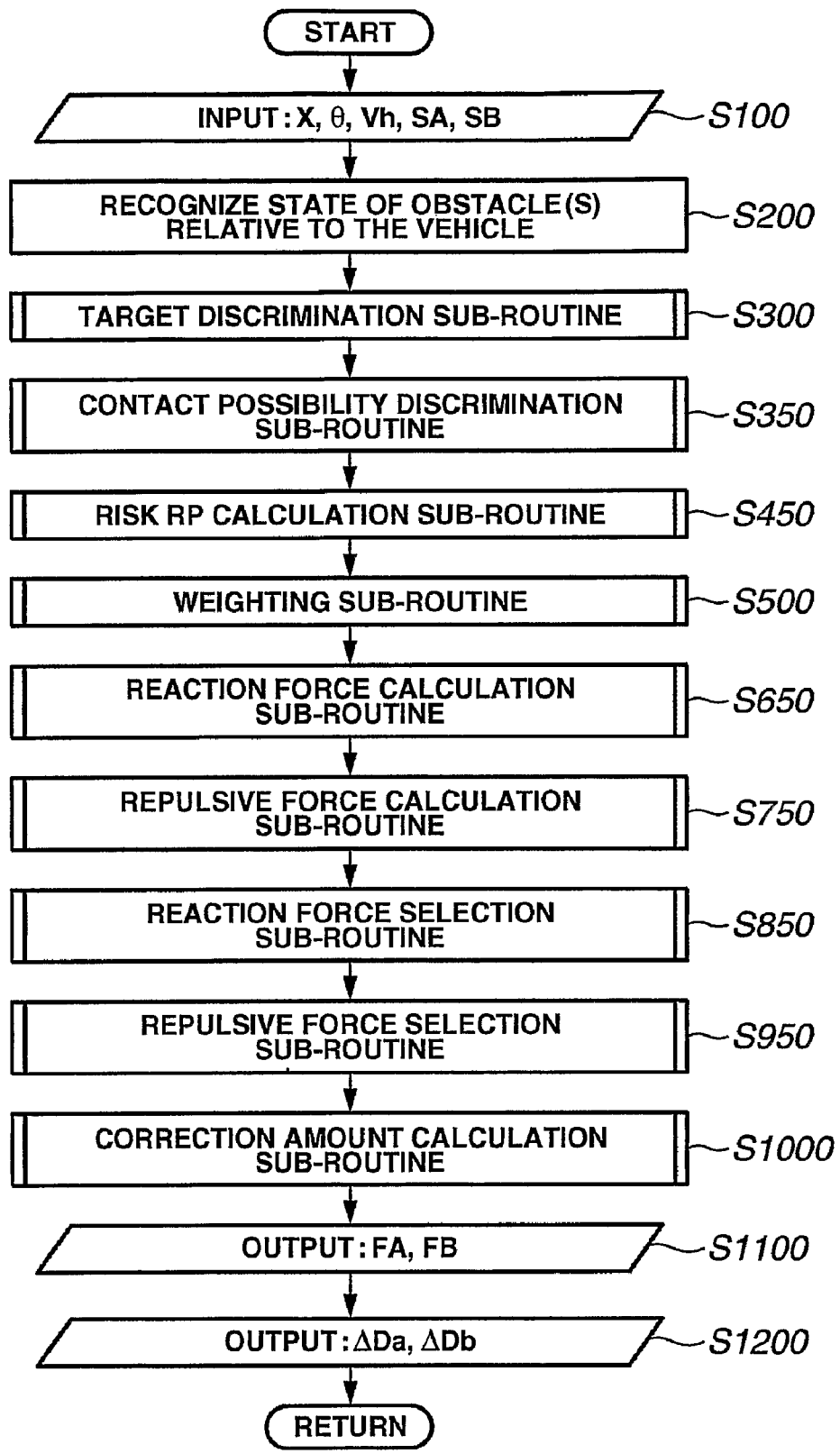
FIG. 35 is a flow chart, similar to FIG. 10, of a main routine illustrating the implementation of operation of the system using the modified controller shown in FIG. 34.

FIG. 35 is a flow chart of a main control routine illustrating the operation of the controller 50B. In the embodiment, the controller 50B repeats execution of the main control routine at regular intervals of, for example, 50 milliseconds.

With reference also to FIG. 10, it will be understood that the main control routines of FIG. 35 and FIG. 10 have like steps S100, S200, S300, S500, S1000, S1100, and S1200. Further, as the discussion proceeds, it will be understood that steps S450, S650, S750, S850 and S950 of the control routine of FIG. 35 are very similar to the steps S400, S600, S700, S800 and S900 of the control routine of FIG. 10, respectively. However, the main control routine of FIG. 35 has a new step S350.

In FIG. 35, the controller 50B performs a reading operation, at step S100, recognizes the state of obstacle(s) relative to the vehicle 5, at step S200, and executes a target discrimination sub-routine shown in FIG. 11, at step S300, to determine whether or not the detected obstacle is a target obstacle.

Figure 36:
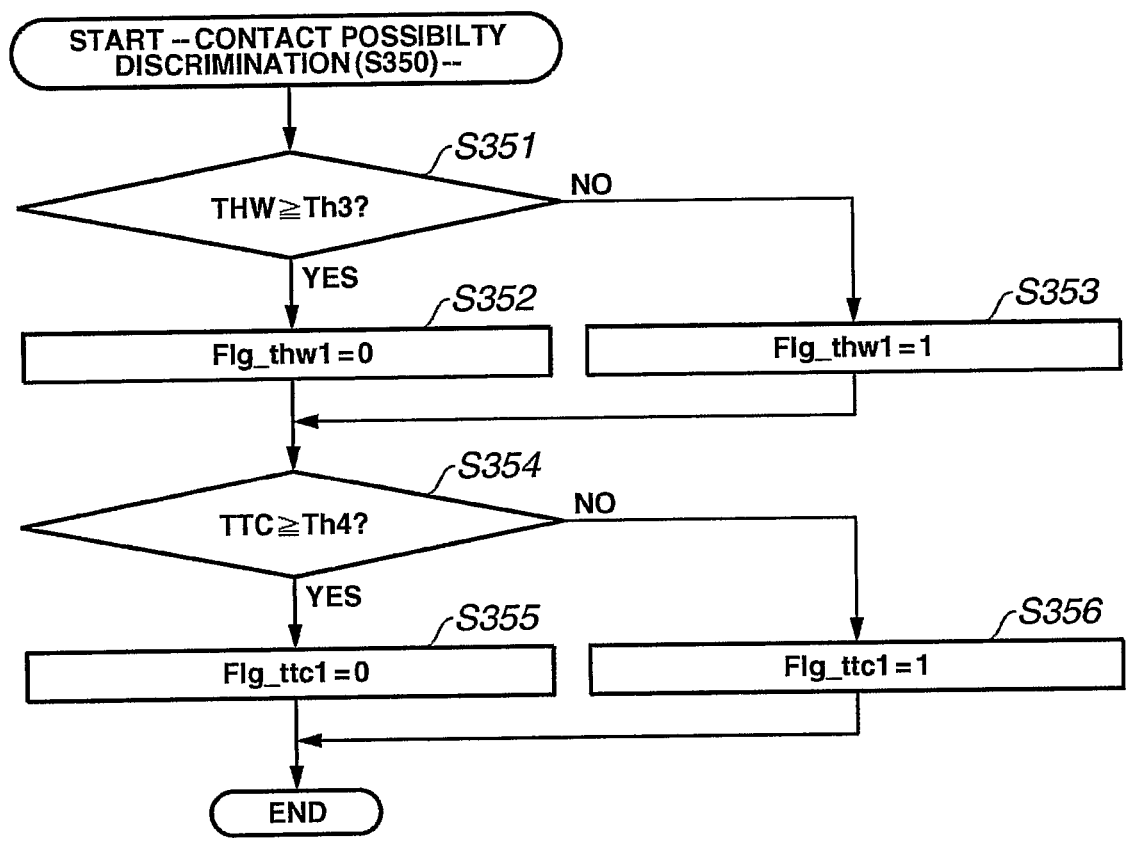
FIG. 36 is a flow chart of a contact possibility discrimination subroutine.

At step S350, the controller 50B executes a contact possibility discrimination sub-routine of FIG. 36.

Referring to the contact possibility discrimination sub-routine of FIG. 36, at step S351, the controller 50B determines whether or not the time headway THW between the detected obstacle and the vehicle 5 is greater than or equal to the third threshold value Th3 (Th3<Th1). If this is the case, that is, THW is not less than Th3, the controller 50B determines that the vehicle 5 may not come into contact with detected obstacle, and sets a THW contact-possibility flag Flg_thw1 to 0 (Flg_thw1=0) at step S352. If, at step S351, the time headway THW is less than Th3, the controller 50B determines that the vehicle 5 may come into contact with the detected obstacle, and sets the THW contact-possibility flag Flg_thw1 to 1 (Flg_thw1=1) at step S353. After step S352 or S353, the routine proceeds to step S354.

At step S354, the controller 50B determines whether or not the time to collision TTC between the detected obstacle and the vehicle 5 is greater than or equal to the fourth threshold value Th4 (Th4<Th2). If this is the case, that is, TTC is not less than Th4, the controller 50B determines that the vehicle 5 may not come into contact with the detected obstacle, and sets a TTC contact-possibility flag Flg_ttc1 to 0 (Flg_ttc1=0) at step S355. If, at step S354, the time to collision TTC is less than Th4, the controller 50B determines that the vehicle 5 may come into contact with the detected obstacle, and sets the TTC contact-possibility flag Flg_ttc1 to 1 (Flg_ttc1=1) at step S356. After step S355 or S356, the routine proceeds to step S450 (see FIG. 35).

Figure 37:
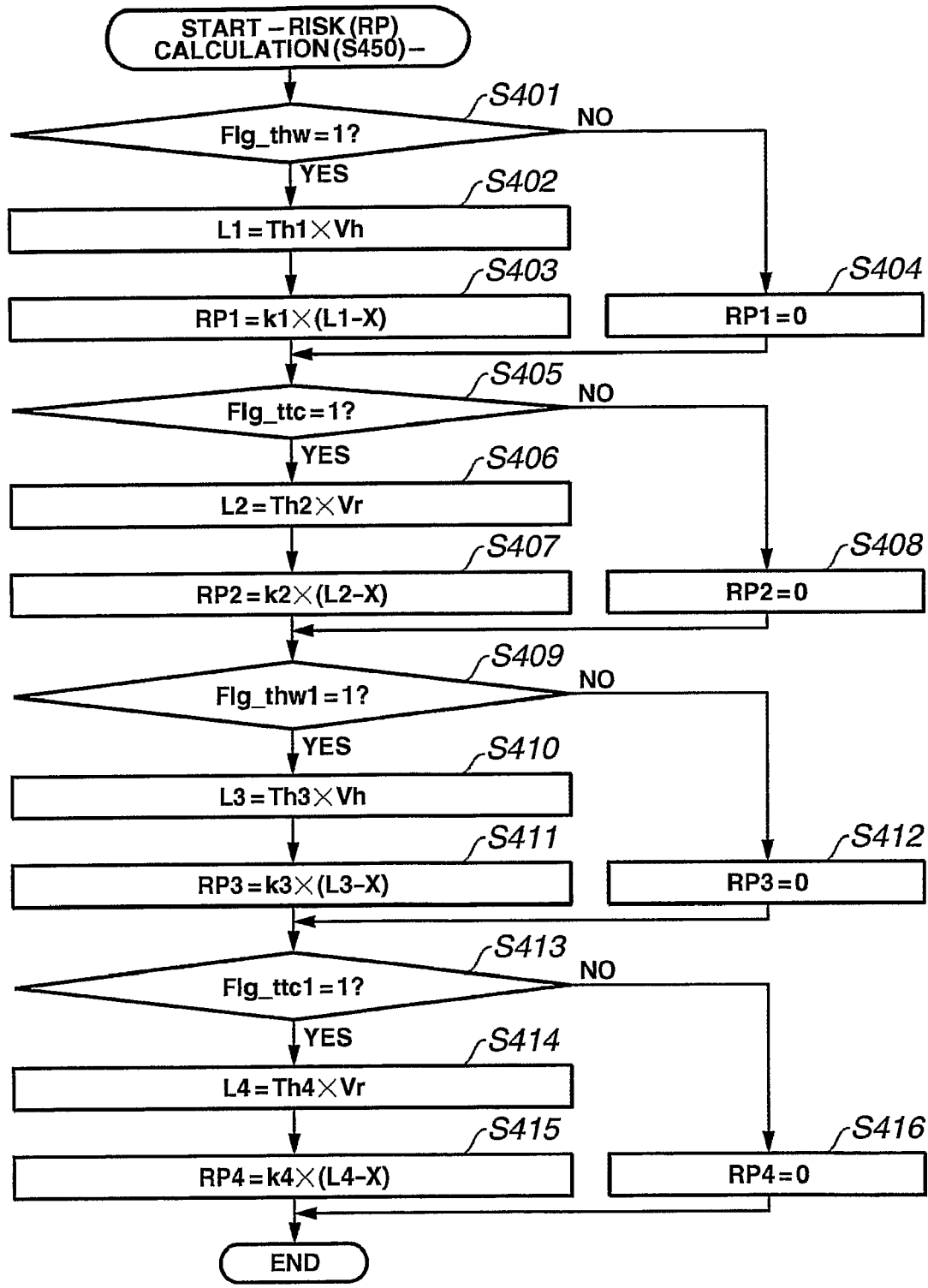
FIG. 37 is a flow chart, similar to FIG. 14, of a risk (RP) calculation subroutine.

At step S450, the controller 50B executes a risk (RP) calculation sub-routine of FIG. 37. The sub-routines of FIGS. 37 and 14 have steps S401, S402, S403, S404, S405, S406, S407, and S408 in common. For brevity, description on these steps is hereby omitted.

In FIG. 34, at step S409, the controller 50B determines whether or not the THW contact-possibility flag Flg_thw1 is equal to 1. If this is the case, the routine proceeds to step S410 because the vehicle 5 may come into contact with the detected obstacle.

At step S410, the controller 50B determines an unstressed length L3 of a third imaginary elastic body using the third threshold value Th3 and the vehicle speed Vh. The unstressed length L3 may be expressed as:

$$L3 = Th3 \times Vh \quad \text{(Equation 11)}$$

At step S411, the controller 50B determines the third risk RP3, which may be expressed as:

$$RP3 = k3 \times (L3 - X) \quad \text{(Equation 12)}$$

where: k3 is a spring constant of the third imaginary elastic body.

If, at step S409, the THW contact-possibility flag Flg_thw1 is 0, the routine proceeds to step S412 because the vehicle 5 may not come into contact with the detected obstacle. At step S412, the controller 50B sets the third risk RP3 to 0 (RP3=0). The first risk RP3 may be called a stable risk because it grows during a portion of the stable period. After step S411 or S412, the routine proceeds to step S413.

At step S413, the controller 50B determines whether or not the TTC target flag Flg_ttc1 is equal to 1. If this is the case, the routine proceeds to step S413 because the vehicle 5 may come into contact with the detected obstacle.

At step S414, the controller 50B determines an unstressed length L4 of a fourth imaginary elastic body using the fourth threshold value Th4 and the relative vehicle speed Vr. The unstressed length L4 may be expressed as:

$$L4 = Th4 \times Vr \quad \text{(Equation 13)}$$

At step S415, the controller 50B determines the fourth risk RP4, which may be expressed as:

$$RP4 = k4 \times (L4 - X) \quad \text{(Equation 14)}$$

where: k3 is a spring constant of the fourth imaginary elastic body.

If, at step S413, the TTC contact-possibility flag Flg_ttc1 is 0, the routine proceeds to step S416 because the vehicle 5 may not come into contact with the detected obstacle. At step S416, the controller 50B sets the fourth risk RP4 to 0 (RP4=0). The fourth risk RP4 may be called a transient risk because it occurs during a portion of the transient period. After step S415 or S416, the routine proceeds to step S500 (see FIG. 10).

At step S500, the controller 50 executes a weighting sub-routine of FIG. 15.

Figure 38:
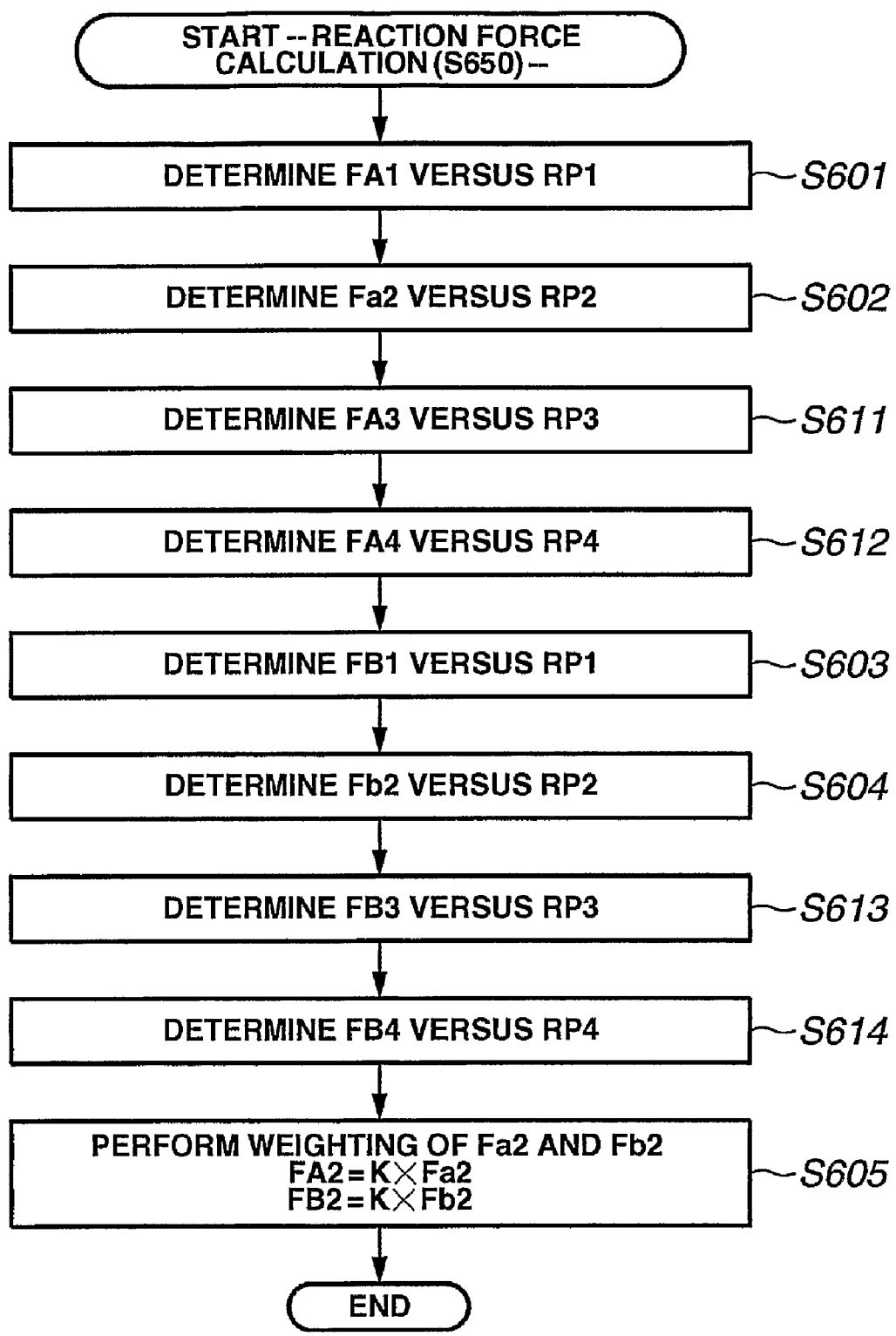
FIG. 38 is a flow chart, similar to FIG. 18, of a reaction force calculation subroutine.

At step S650, the controller 50B executes a reaction force calculation sub-routine of FIG. 38 to determine, as variables, first to fourth accelerator and brake pedal reaction force values FA1 & FB1, FA2 & FB2, FA3 & FB3, and FA4 & FB4

The sub-routines of FIGS. 38 and 18 have steps S601, S602, S603, S604, and S605 in common. For brevity, description on these steps is hereby omitted.

In FIG. 38, at step S611, the controller 50B determines a third accelerator pedal reaction force value FA3 versus the third or stable risk RP3 by using the relationship illustrated in FIG. 19.

At step S612, the controller 50B determines a fourth accelerator pedal reaction force value FA4 versus the fourth or transient risk RP4 by using the relationship illustrated in FIG. 19.

At step S613, the controller 50B determines a third brake pedal reaction force value FB3 versus the third or stable risk RP3 by using the relationship illustrated in FIG. 20.

At step S614, the controller 50B determines a fourth brake pedal reaction force value FB4 versus the fourth or transient risk RP4 by using the relationship illustrated in FIG. 20.

After determining the first to fourth accelerator and brake pedal reaction force values FA1 & FB1, FA2 & FB2, FA3 & FB3, and FA4 & FB4 at step S650, the routine proceeds to step S750.

Figure 39:
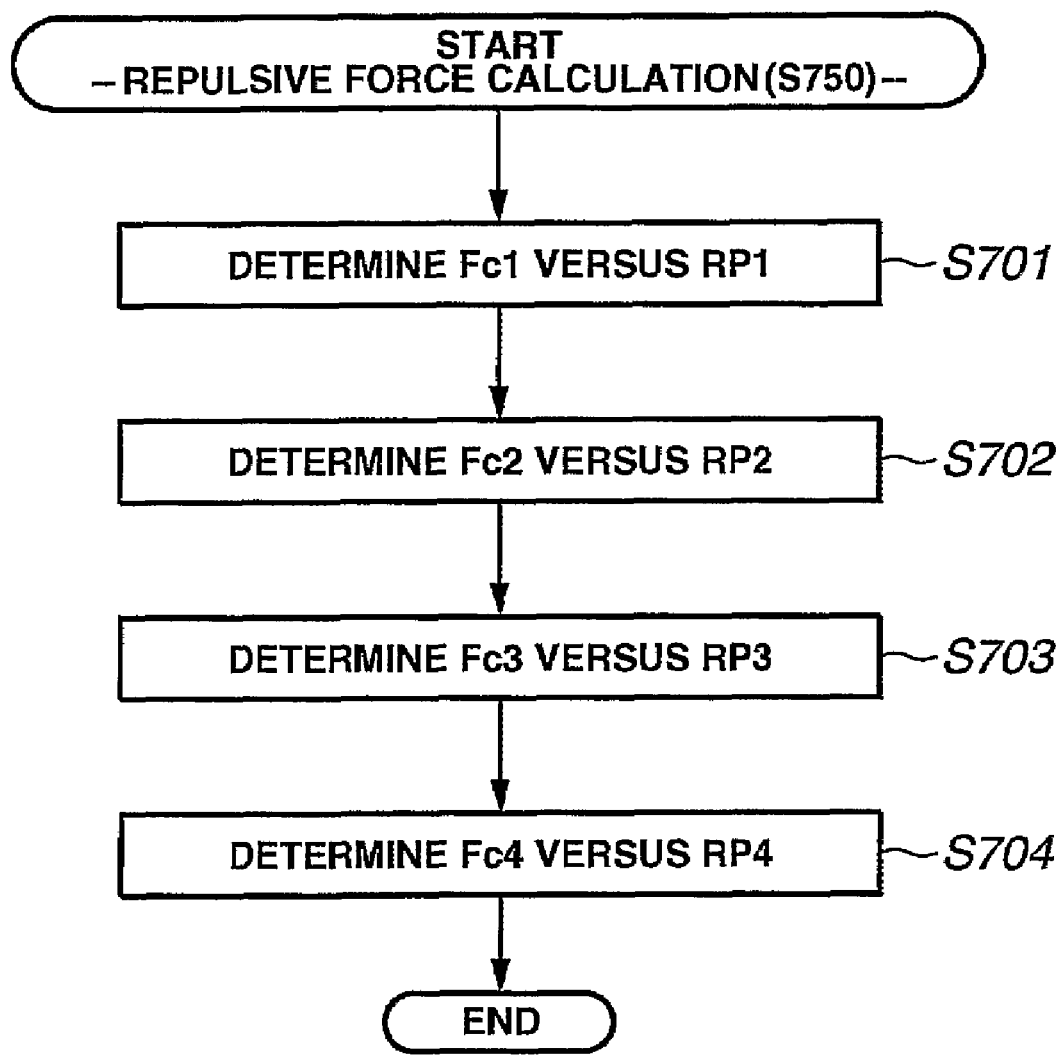
FIG. 39 is a flow chart, similar to FIG. 21, of a repulsive force calculation subroutine.

At step S750, the controller 50B executes a repulsive force calculation sub-routine of FIG. 39. The sub-routines of FIGS. 39 and 21 have steps S701 and S702 in common.

In FIG. 39, at step S703, the controller 50B determines, as a variable, a third repulsive force value Fc3 versus the third or stable risk RP3 by using the relationship illustrated in FIG. 22.

At the next step S704, the controller 50B determines, as a variable, a fourth repulsive force value Fc4 versus the fourth or transient risk RP4 by using the relationship illustrated in FIG. 22.

After determining the repulsive force values Fc1, Fc2, Fc3, and Fc4 at step S750, the routine proceeds to step S850.

Figure 40:
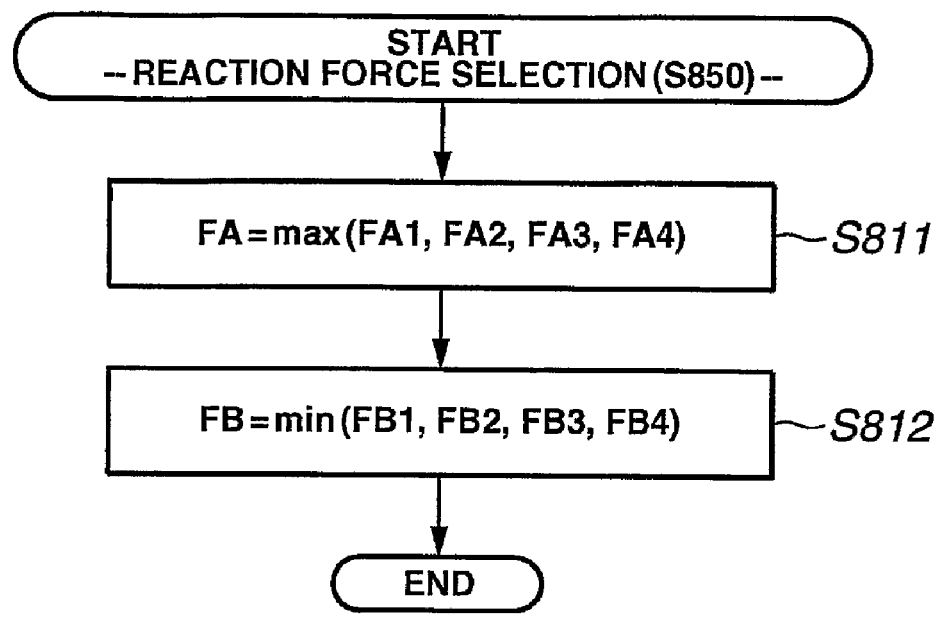
FIG. 40 is a flow chart, similar to FIG. 23, of a reaction force selection subroutine.

At step S850, the controller 50B executes a reaction force selection sub-routine of FIG. 40.

In FIG. 40, at step S811, the controller 50B selects the greatest one, in absolute value, of a set of accelerator pedal reaction force values, including reaction values FA1, FA2, FA3 and FA4, and provides the selected one, as an accelerator pedal reaction force indicative final variable FA, At step S812, the controller 50B selects the smallest one, in absolute value, of a set of brake pedal reaction force values, including reaction values FB1, FB2, FB3, and FB4, and provides the selected one, as a brake pedal reaction force indicative final variable FB.

Figure 41:
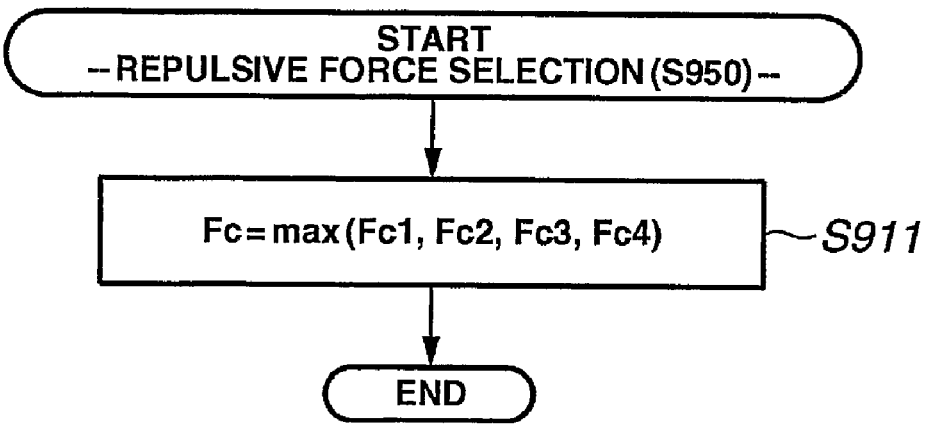
FIG. 41 is a flow chart, similar to FIG. 24, of a repulsive force selection subroutine.

At step S950, the controller 50B executes a repulsive force selection sub-routine of FIG. 41.

In FIG. 41, at step S911, the controller 50B selects the largest one among a set of repulsive force values including the first to fourth repulsive force values Fc1, Fc2, Fe3, and Fe4, and provides the selected one, as the final variable Fc.

After step 950, the controller 50B proceeds to steps S1000, S1100, and S1200.

As described above, the first contact possibility discrimination device 51c determines the possibility whether or not the vehicle 5 may come into contact with the preceding vehicle based on the distance X and vehicle speed Vh. Third risk (RP) calculation device 52c determines the third or state risk RP3 upon determination that the vehicle 5 may come into contact with the preceding obstacle. The third reaction force calculation device 54c determines the accelerator and brake pedal reaction force values FA3 and FB3 based on the third or state risk RP3. The second contact possibility discrimination device 51d determines the possibility whether or not the vehicle 5 may come into contact with the preceding vehicle based on the distance X and relative vehicle speed Vr. Fourth risk (RP) calculation device 52d determines the fourth or transient risk RP4 upon determination that the vehicle 5 may come into contact with the preceding obstacle. The fourth reaction force calculation device 54d determines the accelerator and brake pedal reaction force values FA4 and FB4 based on the fourth or transient risk RP4. The reaction force selection device 56 selects the largest one, in absolute value, of a set of accelerator pedal reaction force values, including the first to fourth reaction force values FA1 to FA4, and provides the selected one, as an accelerator pedal reaction force indicative final variable FA. The reaction force selection device 56 selects the largest one, in absolute value, of brake pedal reaction force values FB1 to FB4, and provides the selected one, as a brake pedal reaction force indicative final variable FB.

After determining a third repulsive force value Fc3 based on the third or stable risk RP3 and a fourth repulsive force value Fc4 based on the fourth or transient risk RP4, the repulsive force selection device 57 selects the largest one, in absolute value, of a set of repulsive force values including the first to fourth repulsive force values Fc1 to Fc4, and provides the selected one, as a repulsive force indicative final variable Fc.

In the embodiments, the reaction force control and the driving force control have been carried out. The present invention is not limited to this example. Use of only one of the reaction force control and the driving force control is possible.

In the embodiments, the accelerator pedal reaction force control and brake pedal reaction force control have been carried out. The present invention is not limited to this example. Use of only one of the accelerator pedal reaction control and brake pedal reaction force control is possible.

While the best modes for carrying out the invention have been described in detail, those familiar with the art to which the present invention relates will recognize various alternative designs and embodiments for practicing the invention as defined by the following claims.

As set forth above, according to a method and system for assisting a driver operating a vehicle traveling on a road of the present invention, transient information that a vehicle is approaching an obstacle can be provided to a driver as well as stable information that the vehicle is following the obstacle in front of the vehicle. Therefore, such a method and system is applicable to a variety of moving bodies such as automotive vehicles, with its application being expected in wide ranges.

The invention claimed is:

1. A system for assisting a driver operating a vehicle traveling on a road, the system comprising:
    a reaction force device configured to determine different reaction force values, the different reaction force values including a first reaction force value based on stable information regarding the vehicle and an obstacle detected in a path of the vehicle and a second reaction force value based on transient information regarding the vehicle and the detected obstacle;
    a weighting device configured to weight the second reaction force value based on at least one of a state of the detected obstacle and environment information around the vehicle;
    a reaction force selection device configured to select one of the first and weighted second reaction force values;
    a driver controlled input device manually operable by the driver; and
    an actuator coupled to the driver controlled input device and configured to transmit the selected one of the first and weighted second reaction force values to the driver by a reaction force input via the driver controlled input device.

2. The system as recited in claim 1, wherein the stable information includes a speed of the vehicle and a distance from the vehicle to the obstacle, and the transient information includes the distance from the vehicle to the obstacle and a relative speed of the vehicle with respect to the obstacle.

3. The system as recited in claim 2, further comprising risk calculation devices configured to determine different risks of contact with the obstacle derived from the detected obstacle, the risk calculation devices including a first risk calculation device to determine a first risk derived from the detected obstacle during a stable period when the vehicle follows the detected obstacle and a second risk calculation device configured to determine a second risk derived from the detected obstacle during a transient period partially overlapping the stable period.

4. The system as recited in claim 3, further comprising a reaction force calculation device configured to determine the first reaction force value versus the determined first risk and the second reaction force value versus the determined second risk.

5. The system as recited in claim 4, wherein the weighting device is configure to weight the second reaction force value by multiplying the second reaction force value with a weighting multiplier when a speed of the detected obstacle is greater than a predetermined speed value and an acceleration of the detected obstacle is less than zero, and the reaction force selection device is configured to set a greater one of the first reaction force value and the weighted second reaction force value as the selected one reaction force value, the reaction force selection device configured to provide the actuator with a signal that is indicative of the selected one reaction force value.

6. The system as recited in claim 5, wherein the reaction force device includes a first reaction force calculation device configured to determine the first reaction force value when activated and a second reaction force calculation device configured to determine the second reaction force value when activated, and further comprising a first target discrimination device configured to determine whether the detected obstacle is a target obstacle by effecting a first target discrimination based on the speed of the vehicle and the distance from the vehicle to the detected obstacle, and a second target discrimination device configured to determine whether the detected obstacle is a target obstacle by effecting a second target discrimination based on the distance from the vehicle to the detected obstacle and the relative speed of the vehicle with respect to the detected obstacle, and wherein the first target discrimination device is configured to activate the first reaction force calculation device upon determination that the detected obstacle is the target obstacle, and the second target discrimination device is configured to activate the second reaction force calculation device upon determination that the detected obstacle is the target obstacle.

7. The system as recited in claim 6, further comprising:
a first repulsive force calculation device configured to determine a first repulsive force value versus the first risk;
a second repulsive force calculation device configured to determine a second repulsive force versus the second risk;
a repulsive force selection device configured to select a greater one of the first and second repulsive force values;
a correction amount calculation device configured to determine a correction amount for the selected repulsive force value; and
a correction device configured to reduce a driving force applied to the vehicle in response to the correction amount.

8. The system as recited in claim 7, further comprising:
a sensor configured to detect a driver power demand;
a driving force request generation device configured to generate a driving force request versus the detected driver power demand; and
a driving force controller configured to control an engine of the vehicle in response to the driving force request for generation of a driving force applied to the vehicle, wherein the correction device modifies the generated driving force request in response to the determined correction amount in a direction of providing a reduction in the driving force applied to the vehicle.

9. The system as recited in claim 7, further comprising:
a sensor configured to detect a driver brake demand;
a braking force request generation device configured to generate a braking force request versus the detected driver brake demand; and
a braking force controller configured to control a brake system of the vehicle in response to the braking force request for generation of a braking force applied to the vehicle,
wherein the correction device modifies the generated braking force request in response to the determined correction amount in a direction of providing an increase in the braking force applied to the vehicle.

10. The system as recited in claim 4, wherein the weighting device performs the weighting of the second reaction force value when the first and second risks are each greater than a predetermined value.

11. The system as recited in claim 4, wherein the weighting device performs the weighting of the second reaction force value when the second reaction force value is greater than the first reaction force value and the first and second risks are each greater than a predetermined value.

12. The system as recited in claim 4, wherein the weighting device performs the weighting of the second reaction force value when the weighted second reaction force value is greater than the first reaction force value and the first and second risks are each greater than a predetermined value.

13. The system as recited in claim 4, further comprising a scene recognition device configured to detect an obstacle in the path of the vehicle, the scene recognition device being configured to provide data necessary for the system to determine whether the detected obstacle is stationary or in motion, and wherein the weighting device makes the weighting of the second reaction force value heavier upon determination that the detected obstacle is in motion than it does upon determination that detected the obstacle is stationary.

14. The system as recited in claim 4, further comprising a scene recognition device configured to detect an obstacle in the path of the vehicle, the scene recognition device being configured to provide data necessary for the system to determine whether or not the detected obstacle is being decelerated, and wherein the weighting device makes the weighting of the second reaction force value heavier upon determination that the detected obstacle is being decelerated than it does upon determination that the detected obstacle is not being decelerated.

15. The system as recited in claim 6,
wherein the first target discrimination device determines that the detected obstacle is the target obstacle when a time headway (THW), which is obtained by dividing the distance by the speed of the vehicle, is less than a first threshold value, and
wherein the second target discrimination device determines that the detected obstacle is the target obstacle when a time to collision (TTC), which is obtained by dividing the distance by the relative speed of the vehicle with respect to the detected obstacle, is less than a second threshold value.

16. The system as recited in claim 1, wherein the driver controlled input device includes at least one of an accelerator pedal and a brake pedal.

17. The system as recited in claim 3, further comprising:
a first contact possibility discrimination device configured to determine whether or not the vehicle may come into contact with the detected obstacle by effecting contact possibility discrimination based on the distance and the speed of the vehicle;
a third risk calculation device configured to determine a third risk derived from the detected obstacle upon determination, by the first contact possibility discrimination device, that the vehicle may come into contact with the detected obstacle;
a third reaction force calculation device configured to determine a third reaction force value versus the determined third risk;
a second contact possibility discrimination device configured to determine whether or not the vehicle may come into contact with the detected obstacle by effecting contact possibility discrimination based on the distance and the relative speed of the vehicle with respect to the detected obstacle;
a fourth risk calculation device configured to determine a fourth risk derived from the detected obstacle upon determination, by the second contact possibility discrimination device, that the vehicle may come into contact with the detected obstacle; and
a fourth reaction force calculation device configured to determine a fourth reaction force value versus the determined fourth risk,
wherein the reaction force selection device selects the greatest one among the first reaction force value, the weighted second reaction force value, the third reaction force value, and the fourth reaction force value.

18. A vehicle, comprising:
a scene recognition device configured to detect an obstacle in the path of the vehicle;
a first target discrimination device configured to determine whether or not the detected obstacle is a target obstacle by effecting a first target discrimination based on a vehicle speed of the vehicle and a distance to the detected obstacle from the vehicle;
a first risk calculation device configured to determine a first risk of contact with the obstacle derived from the detected obstacle upon determination, by the first target discrimination device, that the detected obstacle is the target obstacle;
a first reaction force calculation device configured to determine a first reaction force value versus the determined first risk;
a second target discrimination device configured to determine whether or not the detected obstacle is a target obstacle by effecting a second target discrimination based on the distance to the detected obstacle from the vehicle and a relative vehicle speed of the vehicle with respect to the detected obstacle;
a second risk calculation device configured to determine a second risk of contact with the obstacle derived from the detected obstacle upon determination, by the second target discrimination device, that the detected obstacle is the target obstacle;
a second reaction force calculation device configured to determine a second reaction force value versus the determined second risk;
a weighting device configured to weight the second reaction force value based on one of state of the detected obstacle and environment information around the vehicle;
a reaction force selection device configured to select a greater one, in absolute value, of the first reaction force value and the weighted second reaction force value;
a driver controlled input device manually operable by a driver; and
an actuator coupled to the driver controlled input device and configured to transmit the selected one of the first reaction force value and the weighted second reaction value to the driver by a reaction force input via the driver controlled input device.

19. A method for assisting a driver operating a vehicle traveling on a road by manually operating a driver controlled input device of the vehicle, the method comprising:
detecting an obstacle in the path of the vehicle;
determining whether or not the detected obstacle is a target obstacle by effecting a first target discrimination based on a vehicle speed of the vehicle and a distance to the detected obstacle from the vehicle;
determining a first risk of contact with the obstacle derived from the detected obstacle upon determination, by effecting the first target discrimination, that the detected obstacle is the target obstacle;
determining a first reaction force value versus the determined first risk;
determining whether or not the detected obstacle is a target obstacle by effecting a second target discrimination based on the distance to the detected obstacle from the vehicle and a relative vehicle speed of the vehicle with respect to the detected obstacle;
determining a second risk of contact with the obstacle derived from the detected obstacle upon determination, by effecting the second target discrimination, that the detected obstacle is the target obstacle;
determining a second reaction force value versus the determined second risk;
weighting the second reaction force value based on one of state of the detected obstacle and environment information around the vehicle;
selecting a greater one, in absolute value, of the first reaction force value and the weighted second reaction force value; and
transmitting the selected one of the first reaction force value and the weighted second reaction force value to the driver by a reaction force input via the driver controlled input device.

20. A system for assisting a driver operating a vehicle traveling on a road, the system comprising:
means for detecting an obstacle in front of the vehicle;
means for determining different reaction force values, including a first reaction force value based on stable information regarding the vehicle and an obstacle detected in a path of the vehicle and a second reaction force value based on transient information regarding the vehicle and the detected obstacle;
means for weighting the second reaction force value based on at least one of a state of the detected obstacle and environment information around the vehicle;
means for selecting one of the first reaction force value and the weighted second reaction force value as a final variable; and
means for transmitting the final variable to the driver.

* * * * *